US012572466B1

(12) United States Patent
Fu et al.

(10) Patent No.: US 12,572,466 B1
(45) Date of Patent: Mar. 10, 2026

(54) STRUCTURES AND METHODS FOR ACCURATE SEGMENTING OF BAD BLOCKS OF NON-VOLATILE MEMORY

(71) Applicant: Sandisk Technologies, Inc., Milpitas, CA (US)

(72) Inventors: Yanli Fu, Shanghai (CN); Liang Li, Shanghai (CN); Sumner Xia, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/827,981

(22) Filed: Sep. 9, 2024

(51) Int. Cl.
G06F 12/02 (2006.01)

(52) U.S. Cl.
CPC .................................. G06F 12/0246 (2013.01)

(58) Field of Classification Search
CPC ......... G06F 12/0246; G06F 2212/7208; G06F 2212/72; G06F 11/00
See application file for complete search history.

(56) References Cited

U.S. PATENT DOCUMENTS

| | | | | |
|---|---|---|---|---|
| 5,930,068 | A * | 7/1999 | Gregg ..................... | G11B 5/596 |
| 8,526,252 | B2 | 9/2013 | Li et al. | |
| 9,235,470 | B2 * | 1/2016 | Bhalerao ............. | G06F 11/1068 |
| 9,997,258 | B2 | 6/2018 | Shepard et al. | |
| 10,223,018 | B2 | 3/2019 | Gunnam et al. | |
| 10,223,216 | B1 | 3/2019 | Dubeyko et al. | |
| 10,346,266 | B2 | 7/2019 | Dubeyko et al. | |
| 11,397,635 | B2 | 7/2022 | Lee et al. | |
| 2009/0172482 | A1 | 7/2009 | Wang et al. | |
| 2009/0327822 | A1 | 12/2009 | Kameda et al. | |
| 2010/0002512 | A1 | 1/2010 | Cornwell et al. | |
| 2012/0173920 | A1 | 7/2012 | Park | |
| 2013/0286742 | A1 | 10/2013 | Komine et al. | |
| 2015/0117099 | A1 | 4/2015 | Raghu et al. | |
| 2015/0134885 | A1 | 5/2015 | Yeung et al. | |
| 2016/0019111 | A1 | 1/2016 | Kochar et al. | |
| 2018/0286485 | A1 * | 10/2018 | Takizawa ........... | G11C 16/0483 |
| 2019/0042112 | A1 | 2/2019 | Gangadhar et al. | |
| 2019/0237153 | A1 | 8/2019 | Hong et al. | |
| 2021/0173734 | A1 * | 6/2021 | Lee ...................... | G06F 11/0772 |
| 2022/0138043 | A1 * | 5/2022 | Hu ....................... | G06F 11/1068 714/819 |
| 2023/0168811 | A1 * | 6/2023 | Okada ................... | G06F 3/0647 711/103 |

OTHER PUBLICATIONS

International Search Report & The Written Opinion of the International Searching Authority dated Aug. 18, 2025, International Application No. PCT/US2025/026545.

* cited by examiner

*Primary Examiner* — Tasnima Matin

(74) *Attorney, Agent, or Firm* — Pearl Cohen Zedek Latzer Baratz LLP

(57) ABSTRACT

To increase life times of non-volatile memory devices, the bad block information for a device includes not just whether a device is considered good or bad, but, for bad blocks data on the category of the block's failure. When the number of bad blocks exceeds a threshold level, blocks formerly marked bad can, based on their failure category, have their status updated to good for subsequent usage. This information can also be used during factory testing to update the status of blocks initially marked as bad based on failure category.

20 Claims, 20 Drawing Sheets

| Byte | bit [7] | bit [6] | bit [5] | bit [4] | bit [3] | bit [2] | bit [1] | bit [0] |
|---|---|---|---|---|---|---|---|---|
| Byte 0 | Failure category | | | Block1 flag | Failure category | | | Block0 flag |
| Byte 1 | /Failure category | | | /Block1 flag | /Failure category | | | /Block0 flag |

Figure 7

| Byte | bit [7] | bit [6] | bit [5] | bit [4] | bit [3] | bit [2] | bit [1] | bit [0] |
|---|---|---|---|---|---|---|---|---|
| 0x0000h | 1 | 1 | 1 | blk1 flag | 1 | 1 | 1 | blk0 flag |
| 0x0001h | 1 | 1 | 1 | /blk1 flag | 1 | 1 | 1 | /blk0 flag |
| 0x0002h | 1 | 1 | 1 | blk3 flag | 1 | 1 | 1 | blk2 flag |
| 0x0003h | 1 | 1 | 1 | /blk3 flag | 1 | 1 | 1 | /blk2 flag |
| ... | ... | ... | ... | ... | ... | ... | ... | ... |
| 0x07CEh | 1 | 1 | 1 | blk1999 flag | 1 | 1 | 1 | blk1998 flag |
| 0x07CFh | 1 | 1 | 1 | /blk1999 flag | 1 | 1 | 1 | /blk1998 flag |
| 0x07D0h | 1 | 1 | 1 | FROM flag | 1 | 1 | 1 | UROM flag |
| 0x07D1h | 1 | 1 | 1 | /FROM flag | 1 | 1 | 1 | /UROM flag |

Figure 8

Fuse ROM

| Bad BLK info | Bad COL info | Parameters | BLKRD | CRD | ECC & Others |
|---|---|---|---|---|---|

Figure 9

| bit [7] / [3] | bit [6] / [2] | bit [5] / [1] | Bin. | Failure Category |
|---|---|---|---|---|
| 1 | 1 | 1 | 111 | Initial value or good block |
| 1 | 1 | 0 | 110 | Bit ignore =110 |
| 1 | 0 | 1 | 101 | Bit ignore =100 |
| 1 | 0 | 0 | 100 | Bit ignore =80 |
| 0 | 1 | 1 | 011 | ... |
| 0 | 1 | 0 | 010 | ... |
| 0 | 0 | 1 | 001 | ... |
| 0 | 0 | 0 | 000 | ... |

Figure 10

| bit [7] / [3] | bit [6] / [2] | bit [5] / [1] | Bin. | Failure Category |
|:---:|:---:|:---:|:---:|:---:|
| 1 | 1 | 1 | 111 | Initial value or good block |
| 1 | 1 | 0 | 110 | Die sort 1 |
| 1 | 0 | 1 | 101 | Die sort 2 |
| 1 | 0 | 0 | 100 | Wafer burn in |
| 0 | 1 | 1 | 011 | KGD |
| 0 | 1 | 0 | 010 | SH |
| 0 | 0 | 1 | 001 | ... |
| 0 | 0 | 0 | 000 | ... |

Figure 13

STRUCTURES AND METHODS FOR ACCURATE SEGMENTING OF BAD BLOCKS OF NON-VOLATILE MEMORY

BACKGROUND

Semiconductor memory is widely used in various electronic devices such as cellular telephones, digital cameras, personal digital assistants, medical electronics, mobile computing devices, non-mobile computing devices and data servers. Semiconductor memory may comprise non-volatile memory, volatile memory or both. Non-volatile memory allows information to be stored and retained even when the non-volatile memory is not connected to a source of power (e.g., a battery). Examples of non-volatile memory include flash memory (e.g., NAND-type and NOR-type flash memory), Electrically Erasable Programmable Read-Only Memory (EEPROM), and others.

Memory devices will often have defects that occur as part of the fabrication process. After being manufactured and before being sent out to consumers, the memory die are usually put through a series of tests to determine defective portions of the circuit, both of the memory cells and also of peripheral elements. If a device has too many defects, it may be discarded or only used for less demanding applications, while in other cases the defective portions of the memory die can be marked and avoided when the device is in use. For example, the memory cells of a device will often be divided up into blocks and as part of the test process a flag value, such as in a fuse ROM on the memory die, can be set for the defective memory blocks and then these blocks will not be used when the device is in operation.

BRIEF DESCRIPTION OF THE DRAWINGS

Like-numbered elements refer to common components in the different figures.

In some embodiments, the Back End Processor Circuit is part of a controller.

Figure 4:
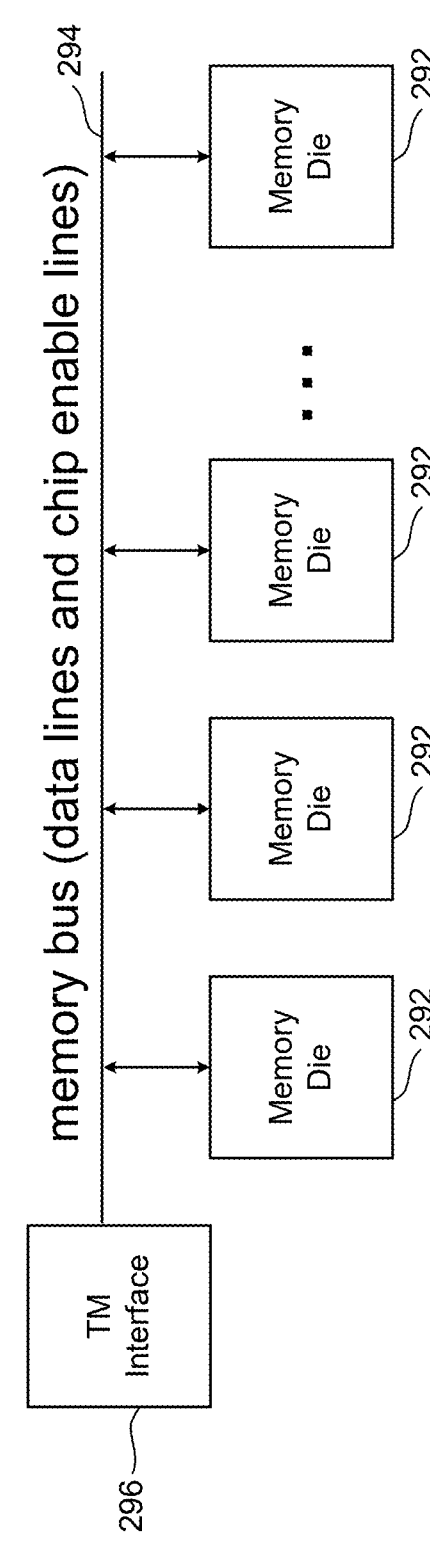

FIG. 4 is a block diagram of one embodiment of a memory package.

Figure 5A:
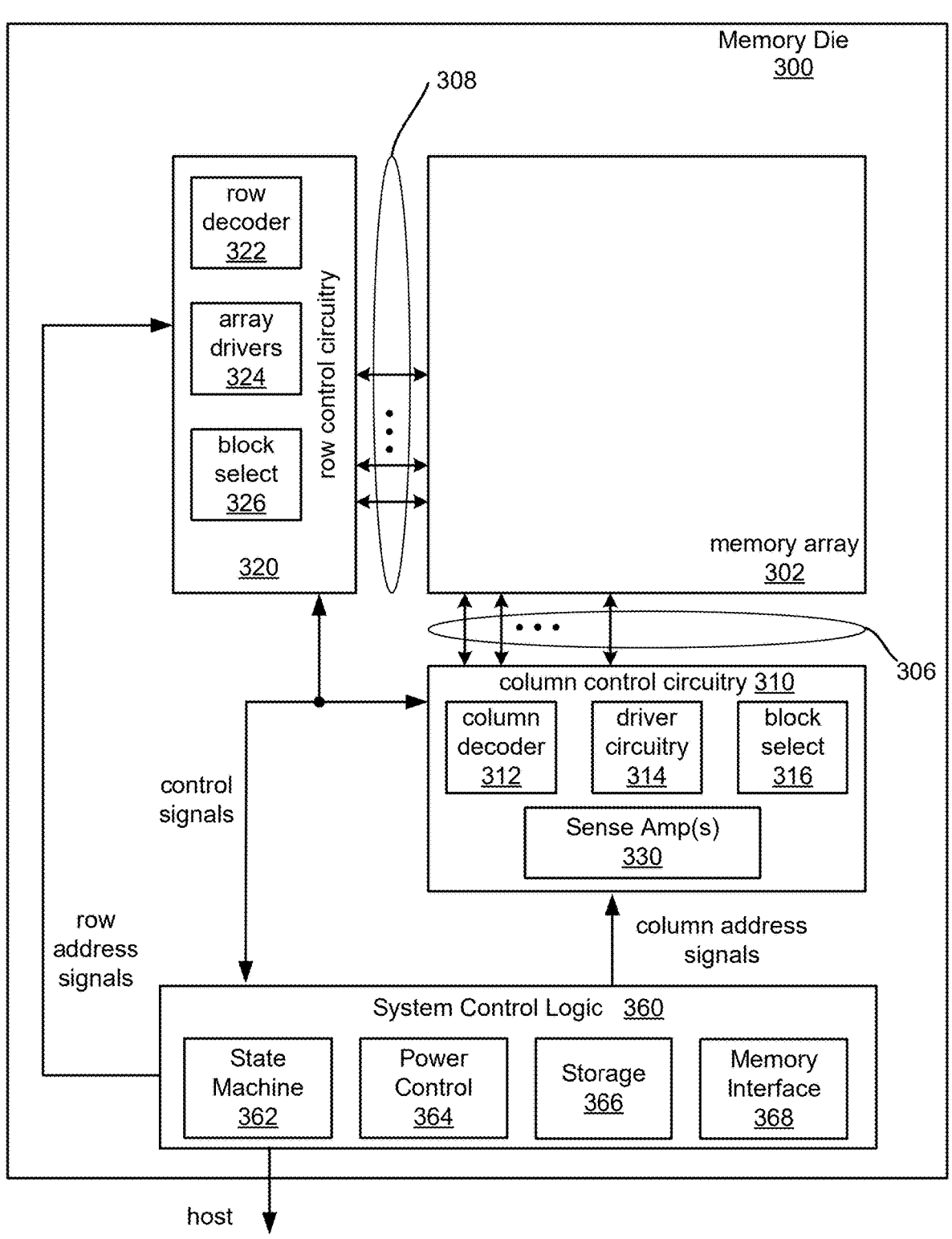

FIG. 5A is a functional block diagram of an embodiment of a memory die.

Figure 5B:
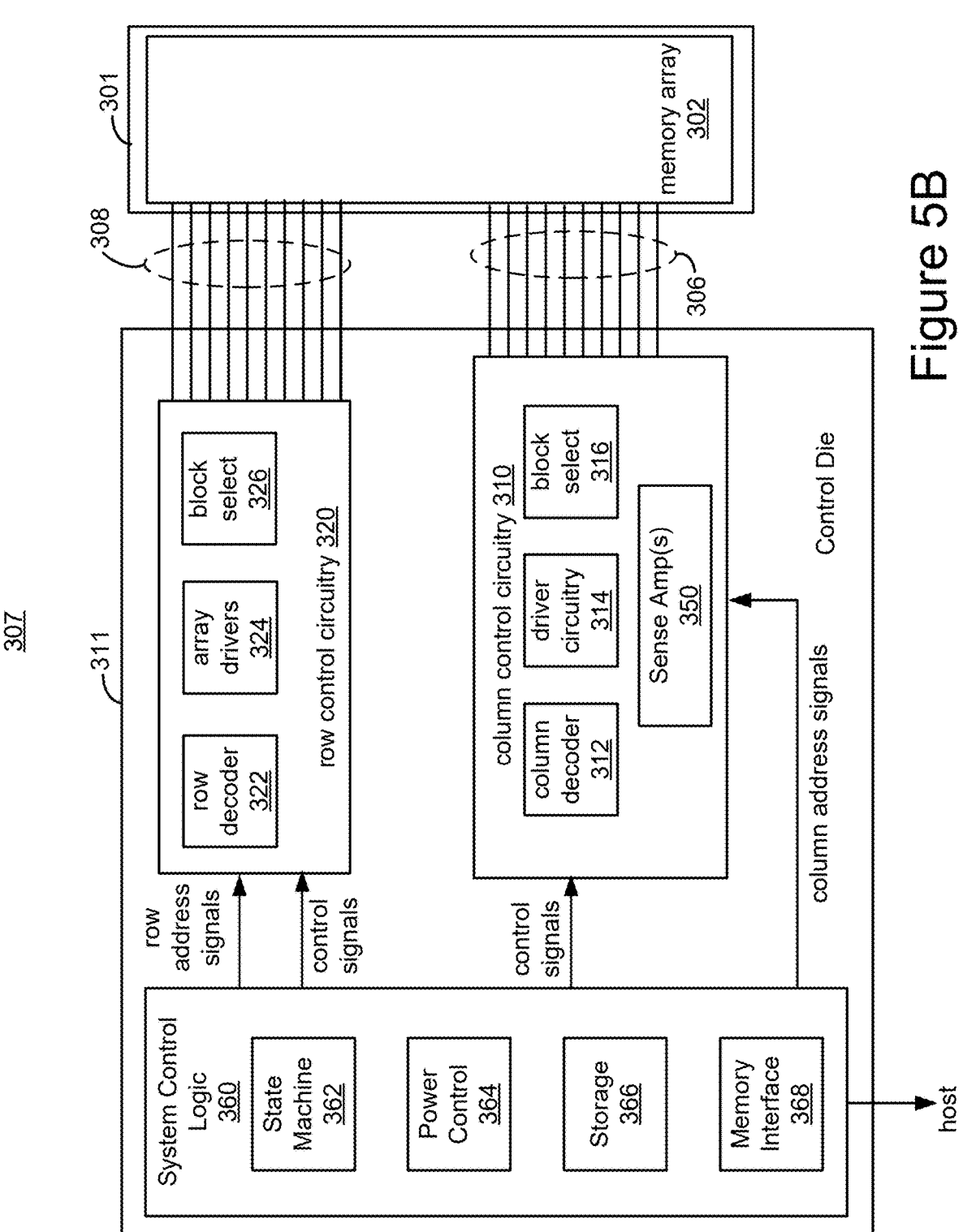

FIG. 5B is a functional block diagram of an embodiment of an integrated memory assembly.

Figure 6A:
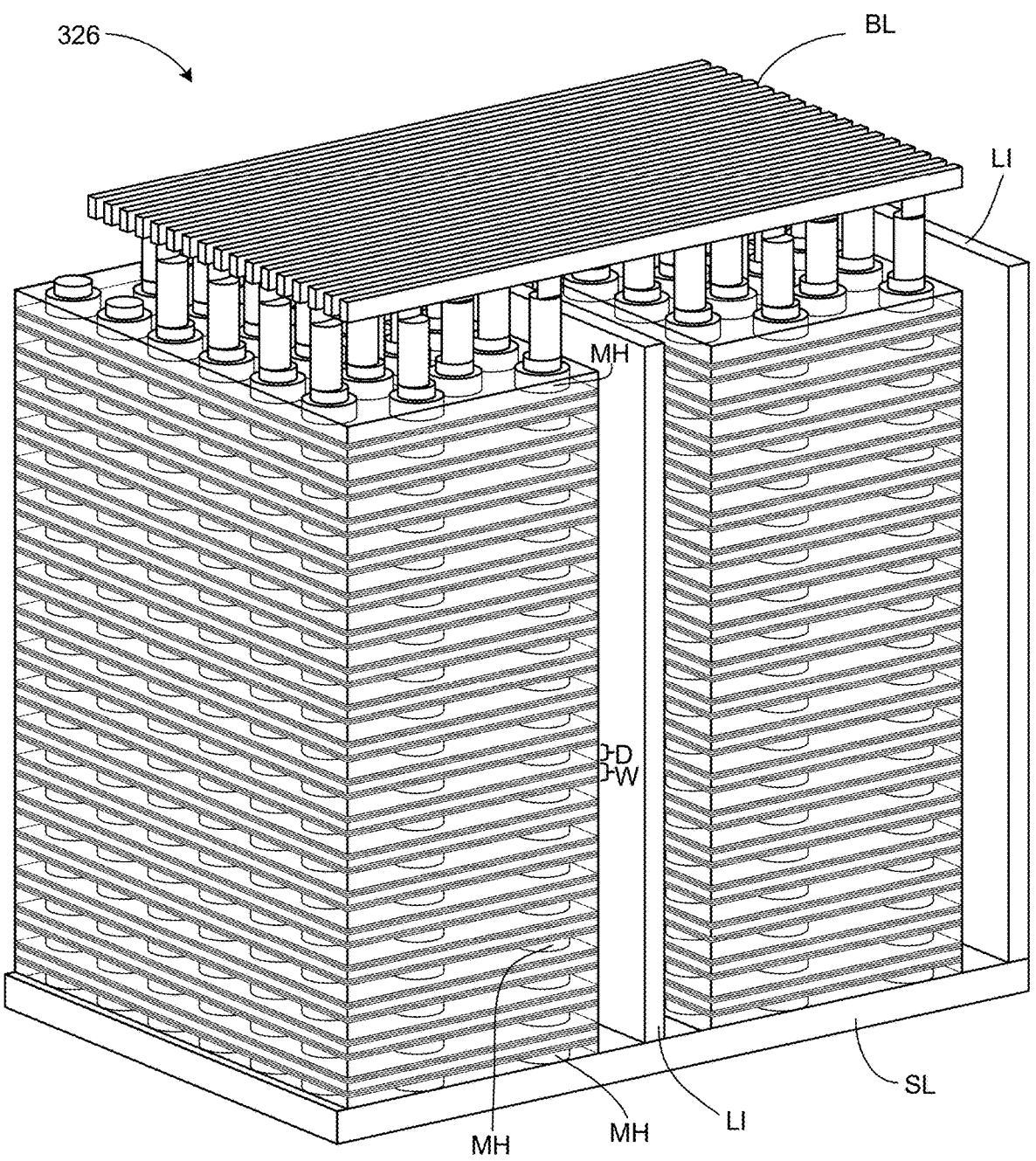

FIG. 6A is a perspective view of a portion of one embodiment of a monolithic three dimensional memory structure.

Figure 6B:
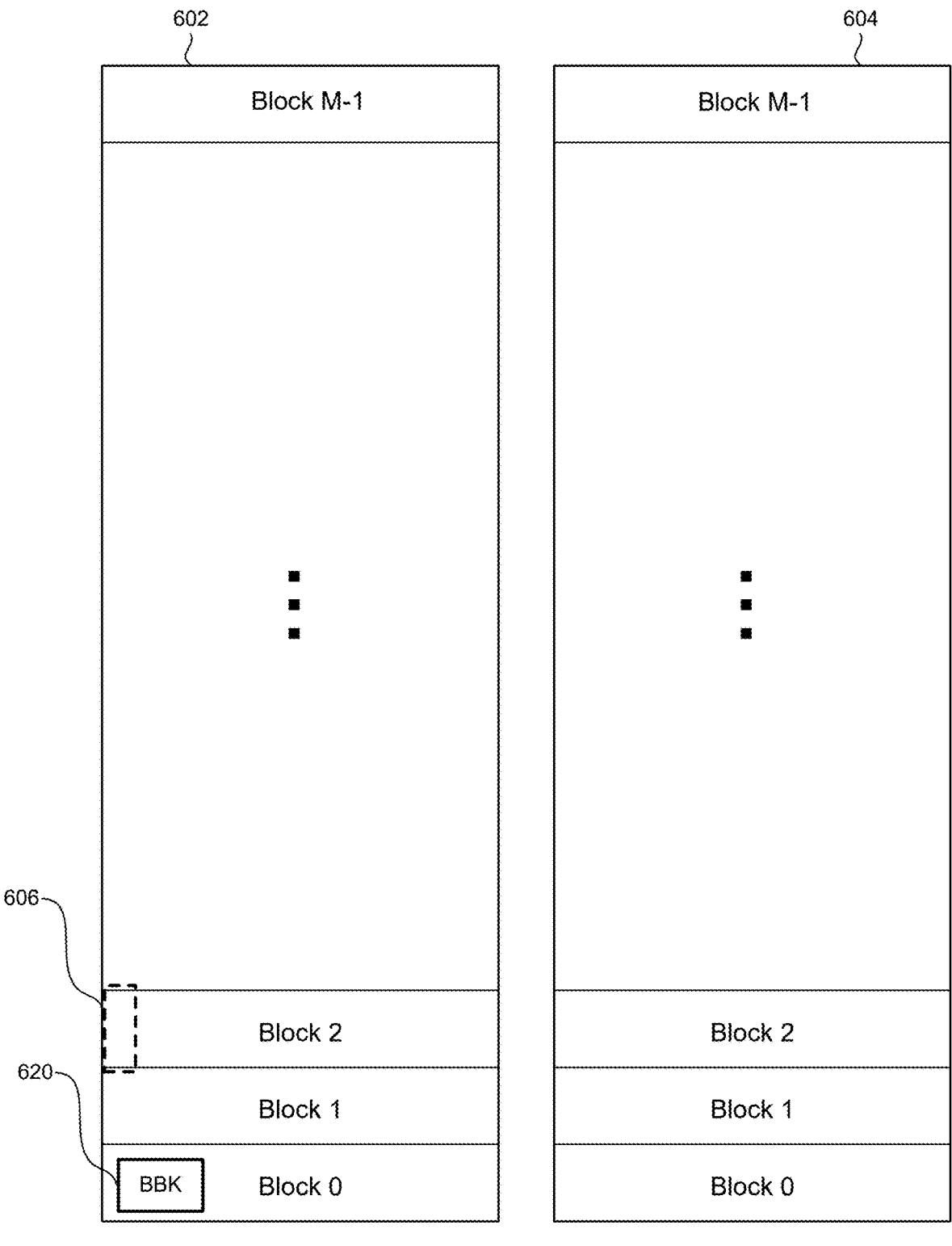

FIG. 6B is a block diagram of a memory structure having two planes.

Figure 6C:
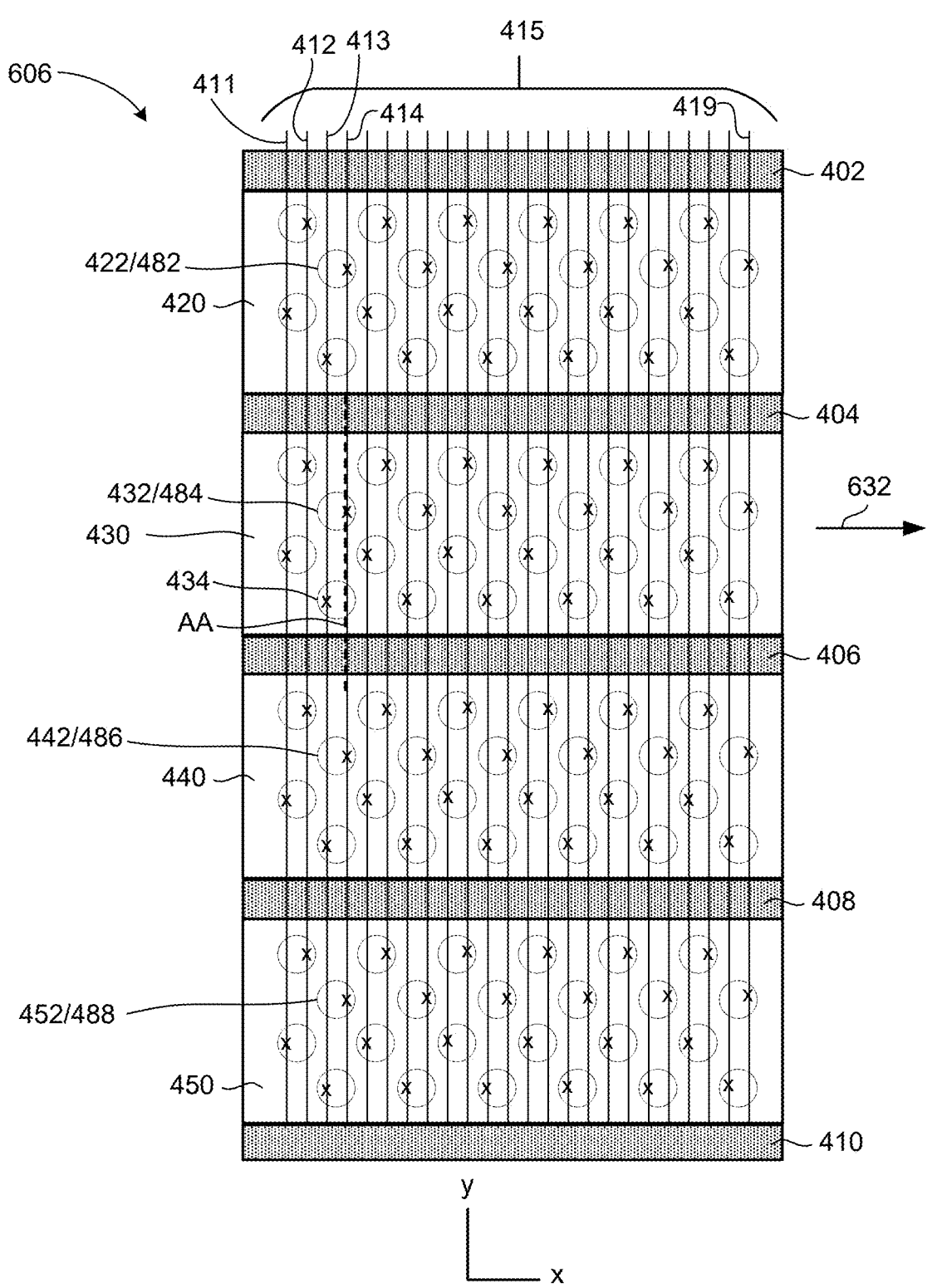

FIG. 6C depicts a top view of a portion of a block of memory cells.

Figure 6D:
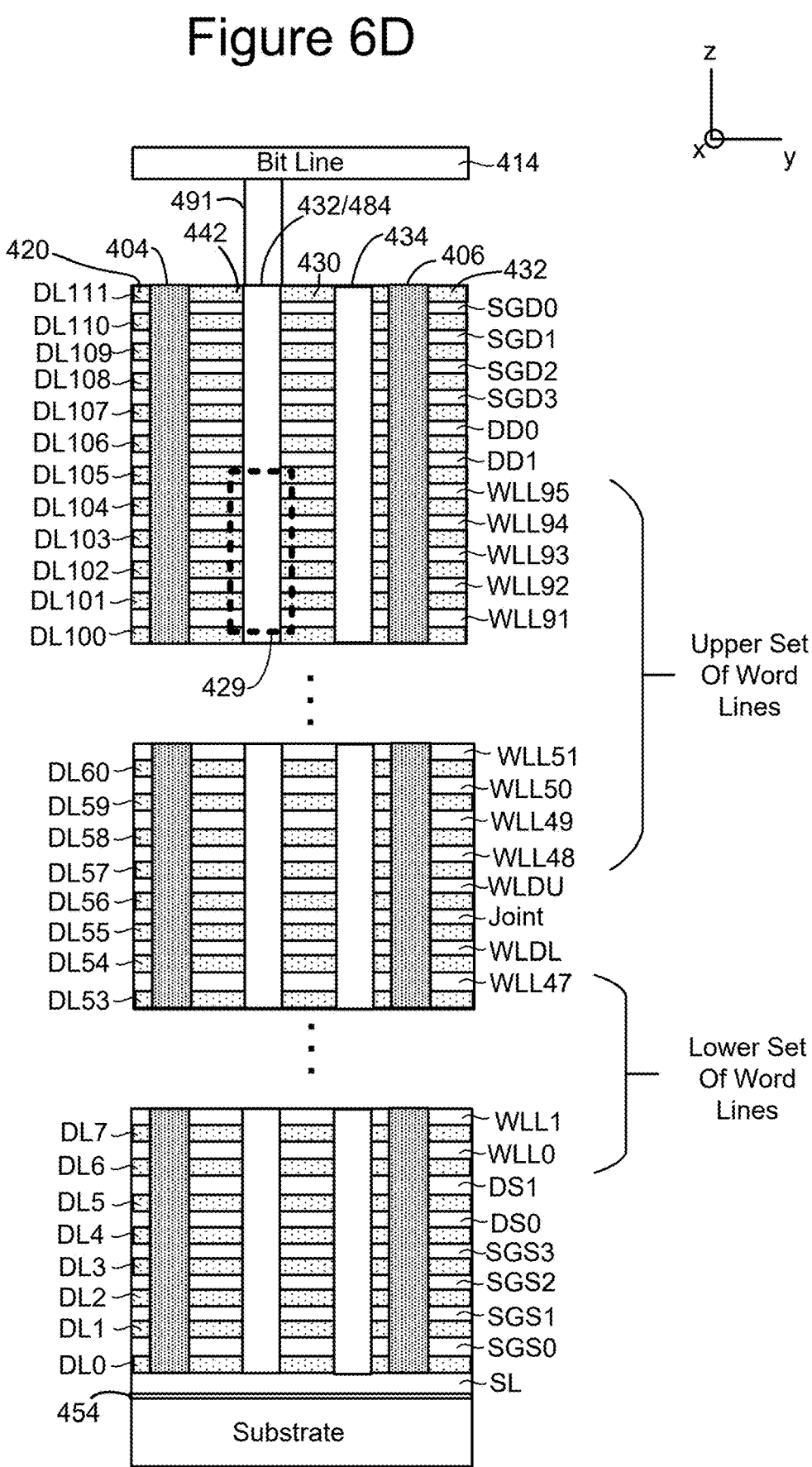

FIG. 6D depicts a cross sectional view of a portion of a block of memory cells.

Figure 6E:
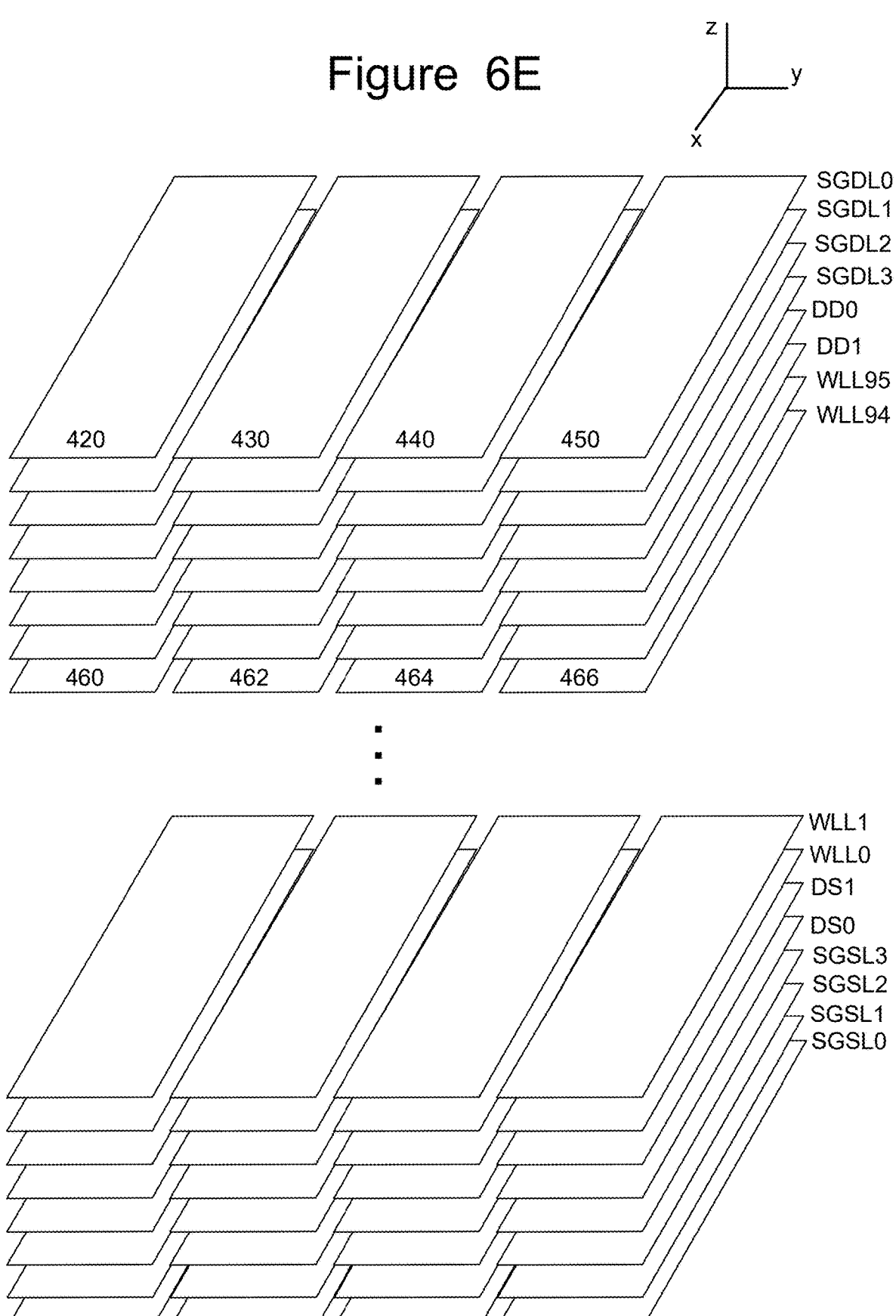

FIG. 6E depicts a view of the select gate layers and word line layers.

Figure 6F:
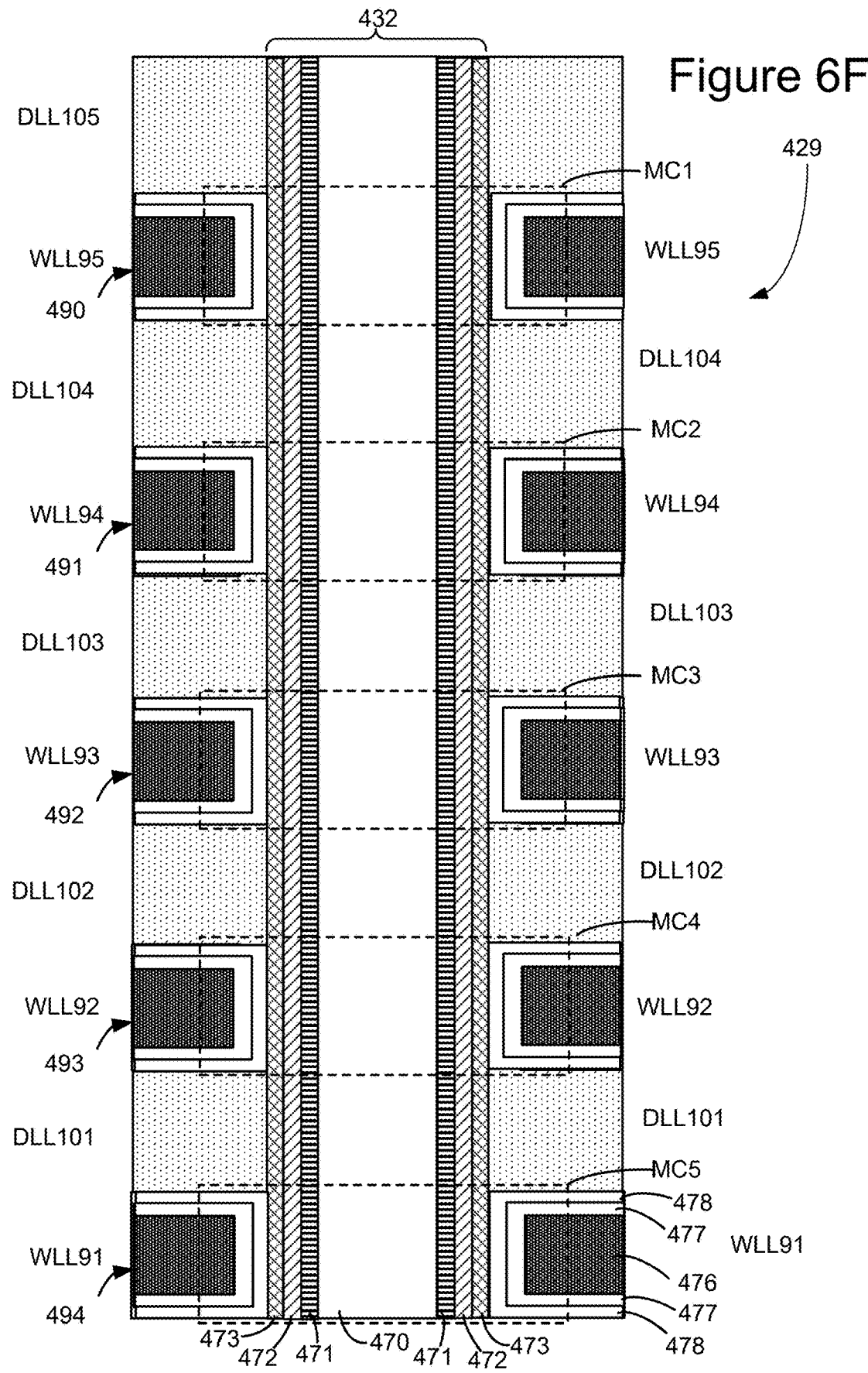

FIG. 6F is a cross sectional view of a vertical column of memory cells.

Figure 6G:
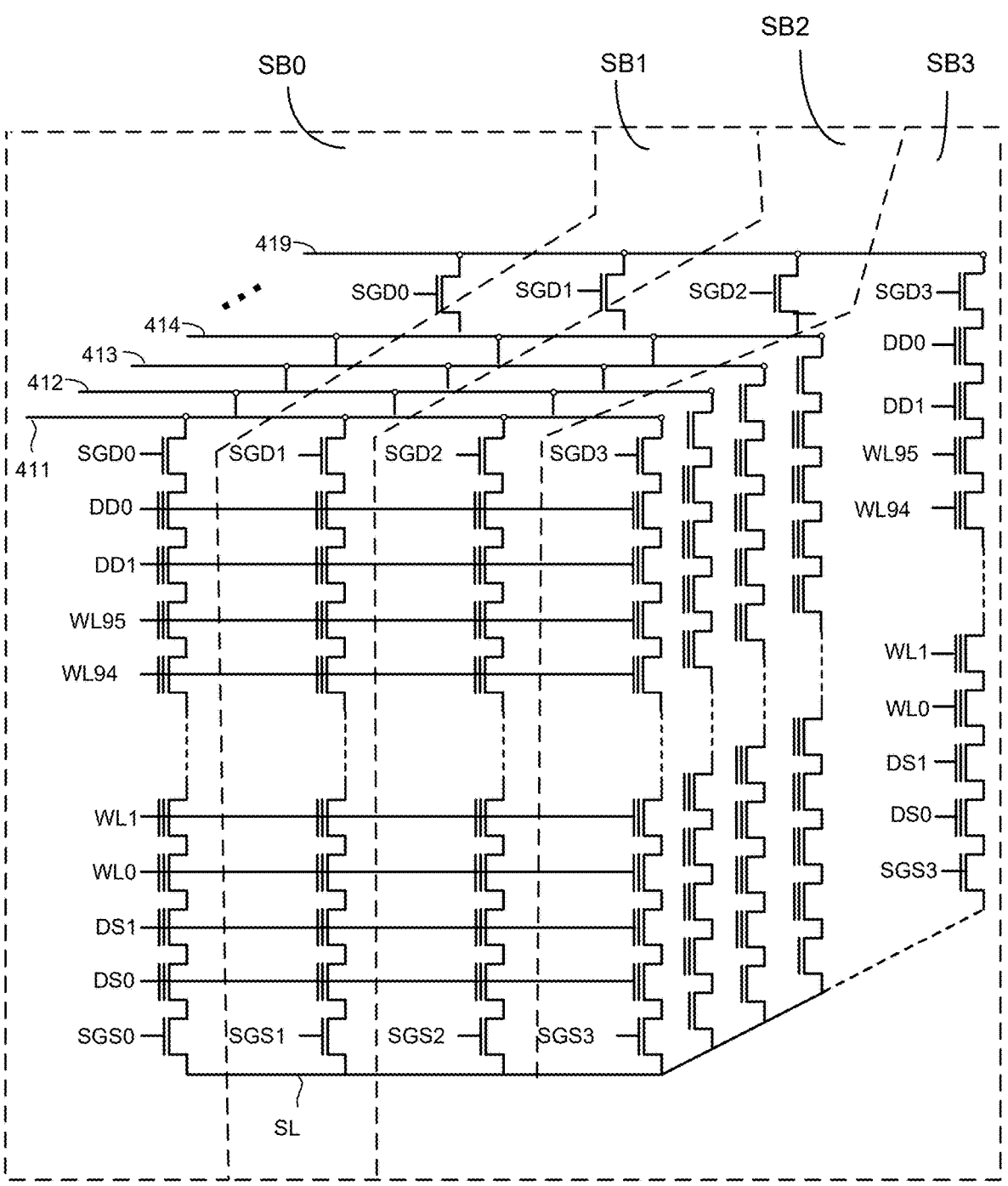

FIG. 6G is a schematic of a plurality of NAND strings showing multiple sub-blocks.

FIG. 7 illustrates an embodiment of a bad block structure.

FIG. 8 illustrates an embodiment for a bad block structure in a Fuse RAM block.

FIG. 9 illustrates an embodiment for the information structure in the Fuse ROM block.

FIG. 10 is an embodiment for incorporating failure category, such as by bit ignore values, in field applications.

Figure 11:
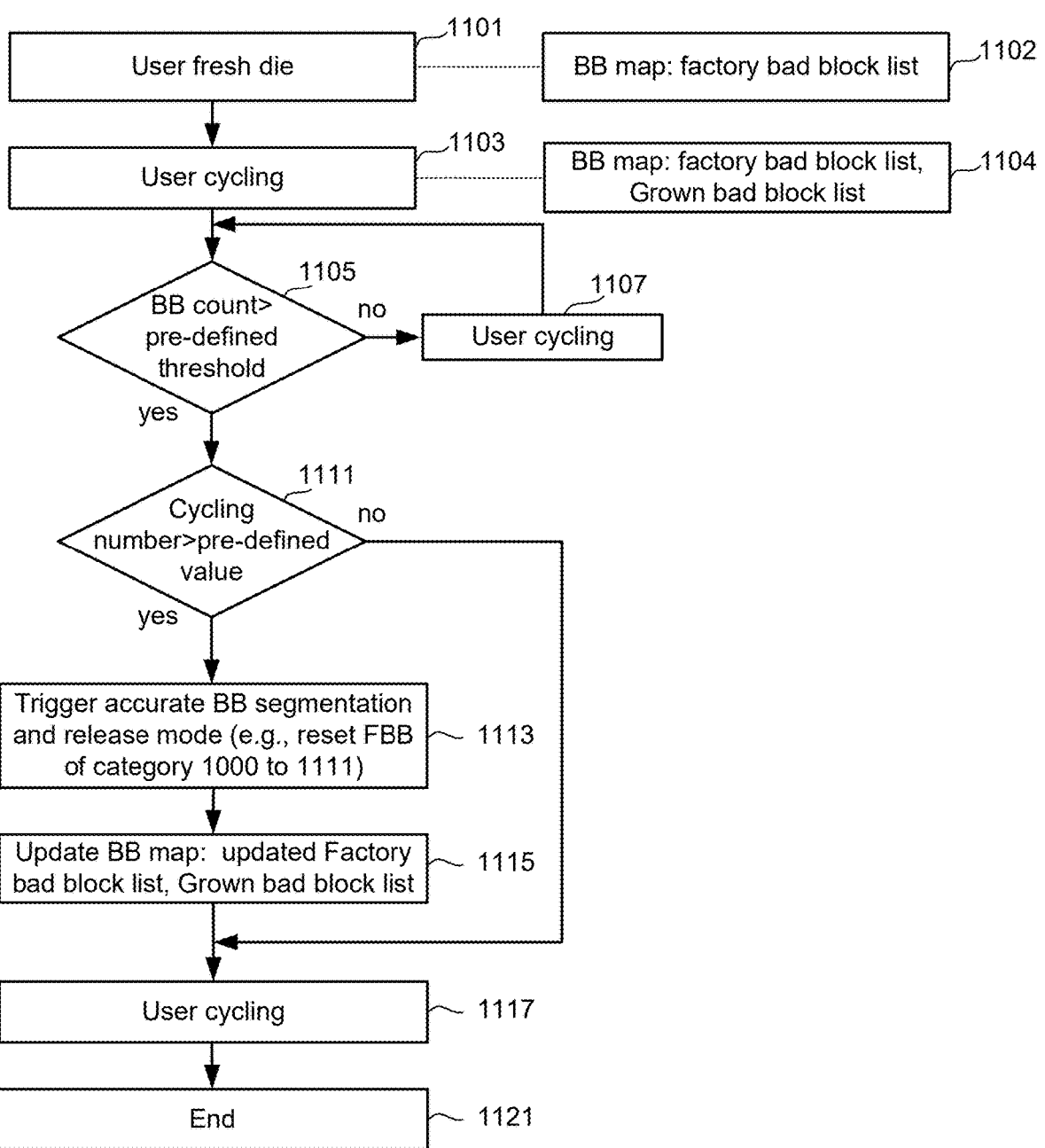

FIG. 11 is a flowchart of an embodiment for storage capacity recovery with the described bad block structure.

Figure 12:
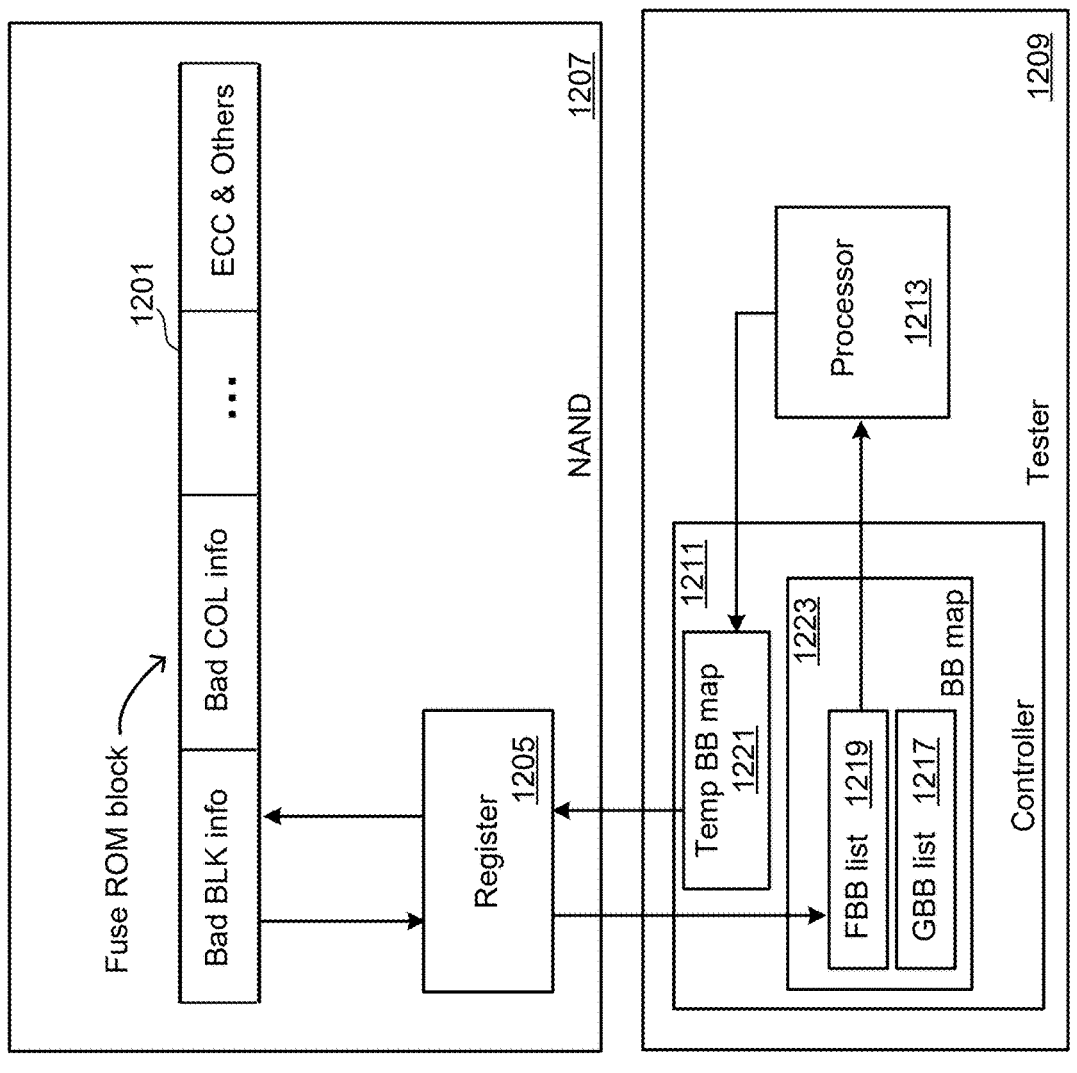

FIG. 12 is a block diagram of an embodiment for the logic for updating bad block information in Fuse ROM block.

FIG. 13 is an example for Failure Category in a factory testing application.

Figure 14:
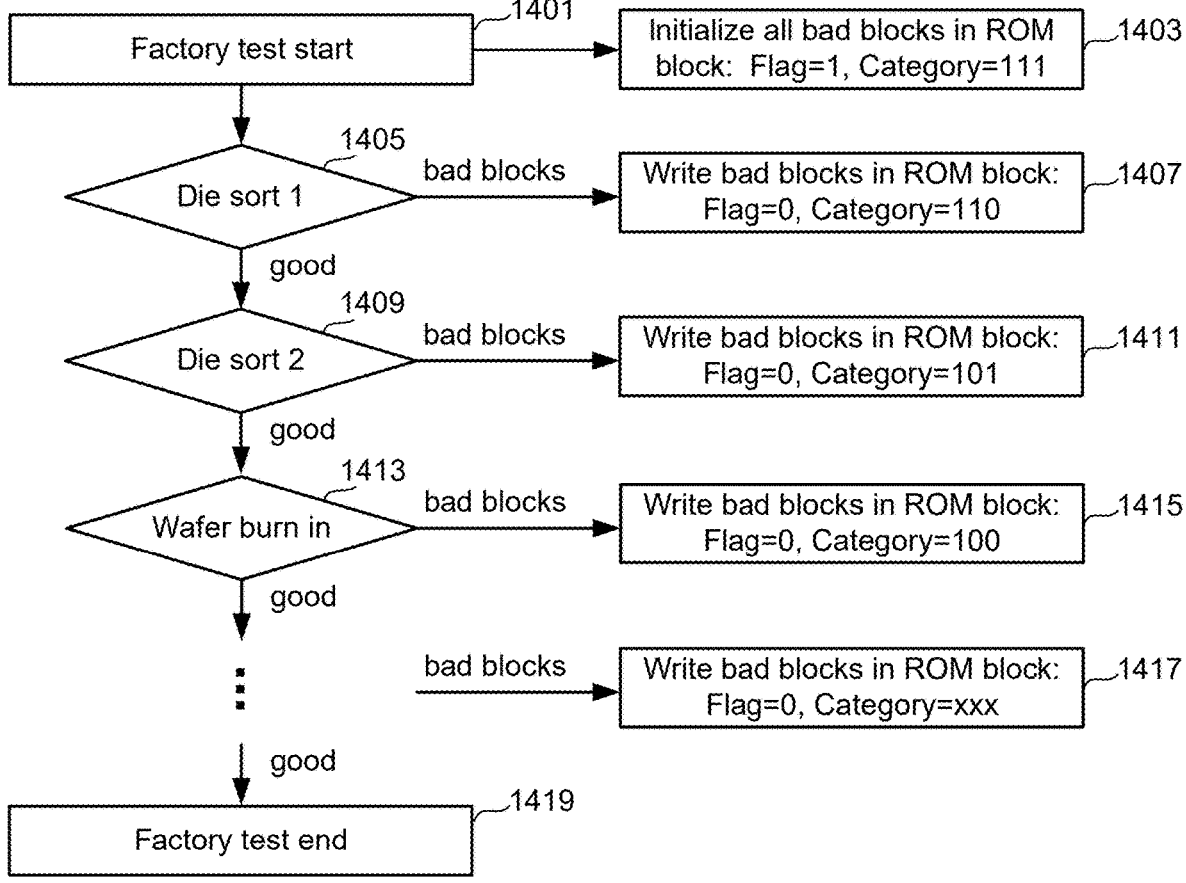

FIG. 14 is a flowchart of an embodiment to mark the factory bad blocks by different failure categories in factory test stages.

Figure 15:
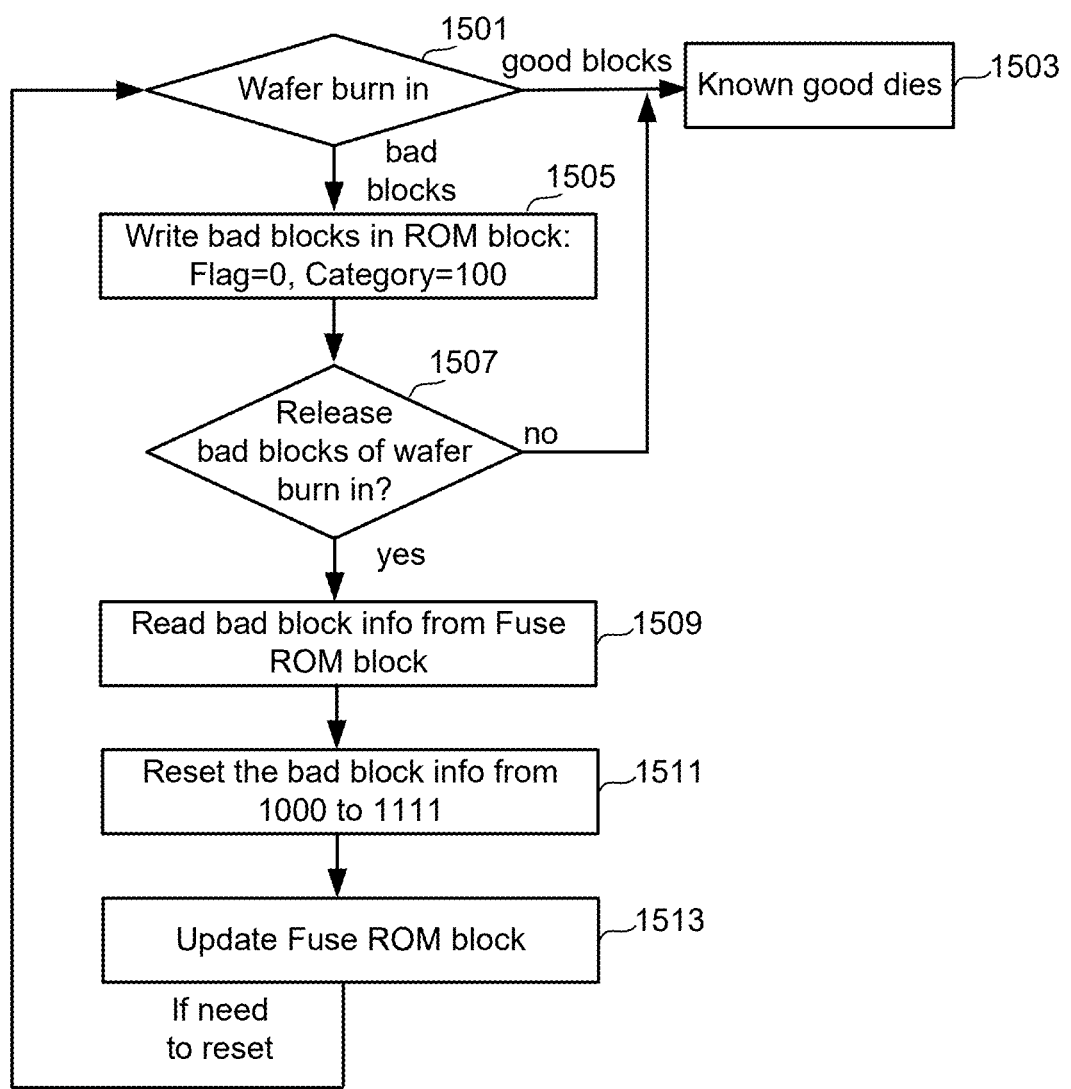

FIG. 15 is a flowchart of an embodiment for selective factory bad block information update of Fuse ROM values during wafer burn in.

DETAILED DESCRIPTION

Prior to usage, non-volatile memory die are typically subjected to a sequence of tests to determine the quality of the blocks of memory cells on the memory die. The blocks are typically grouped into good blocks, having no or minor defects and passing those tests, and bad blocks, having serious defects and failing those tests. If the number of bad blocks of a new device is too high, it will not be shipped to customers. If the number of bad blocks is not to high, the device will be shipped and the bad blocks marked as such so that will be excluded from accessible blocks for end user. Once in field use by a customer, as blocks become defective, they are added to the list of bad blocks that are not used to store data and, once the number of bad blocks becomes too high, the device needs to be retired.

In embodiments presented below, to increase device life times, the bad block information for a device includes not just whether a block is considered good or bad, but, for bad blocks data on the category of the block's failure. When the number of bad blocks exceeds a threshold level, blocks formerly marked bad can, based on their failure category, have their status updated to good for subsequent usage. This information can also be used during factory testing to update the status of blocks initially marked as bad based on failure category.

Figure 1:
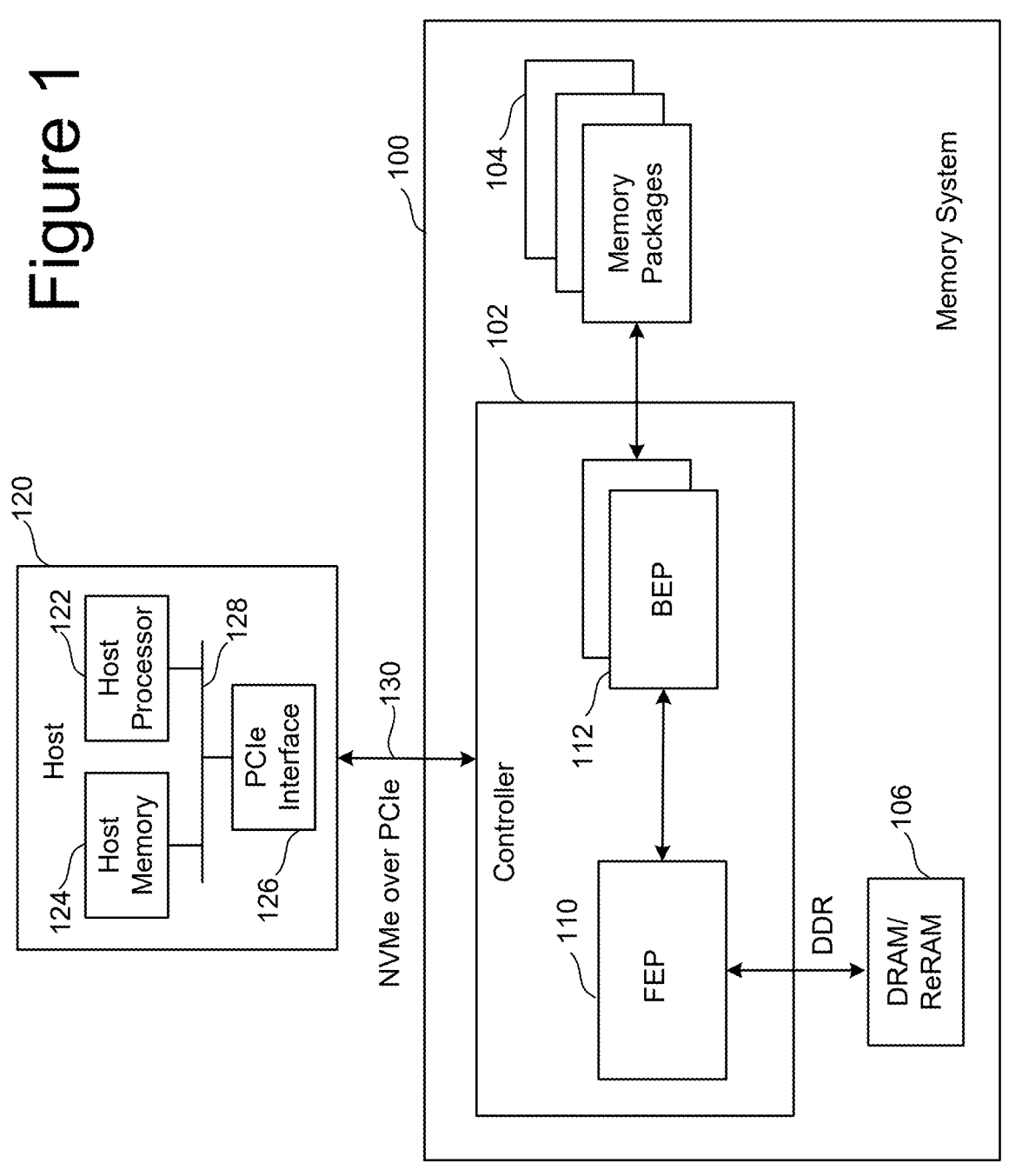
FIG. 1 is a block diagram of one embodiment of a memory system connected to a host.

FIG. 1 is a block diagram of one embodiment of a memory system 100 connected to a host 120. Many different types of memory systems can be used with the technology proposed herein. Example memory systems include solid state drives ("SSDs"), memory cards and embedded memory devices; however, other types of memory systems can also be used.

Memory system 100 of FIG. 1 comprises a controller 102, non-volatile memory 104 for storing data, and local memory (e.g. DRAM/RcRAM) 106. Controller 102 comprises a Front End Processor (FEP) circuit 110 and one or more Back End Processor (BEP) circuits 112. In one embodiment FEP circuit 110 is implemented on an application-specific integrated circuit ("ASIC"). In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/dic at the request of FEP circuit 110. For example, the BEP circuit 112 can carry out the read, erase and programming processes. Additionally, the BEP circuit 112 can perform buffer management, set specific voltage levels required by the FEP circuit 110, perform error correction code (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126 connected along bus 128. Host memory 124 is the host's physical memory, and can be DRAM, SRAM, non-volatile memory or another type of storage. Host 120 is external to and separate from memory system 100. In one embodiment, memory system 100 is embedded in host 120.

Figure 2:
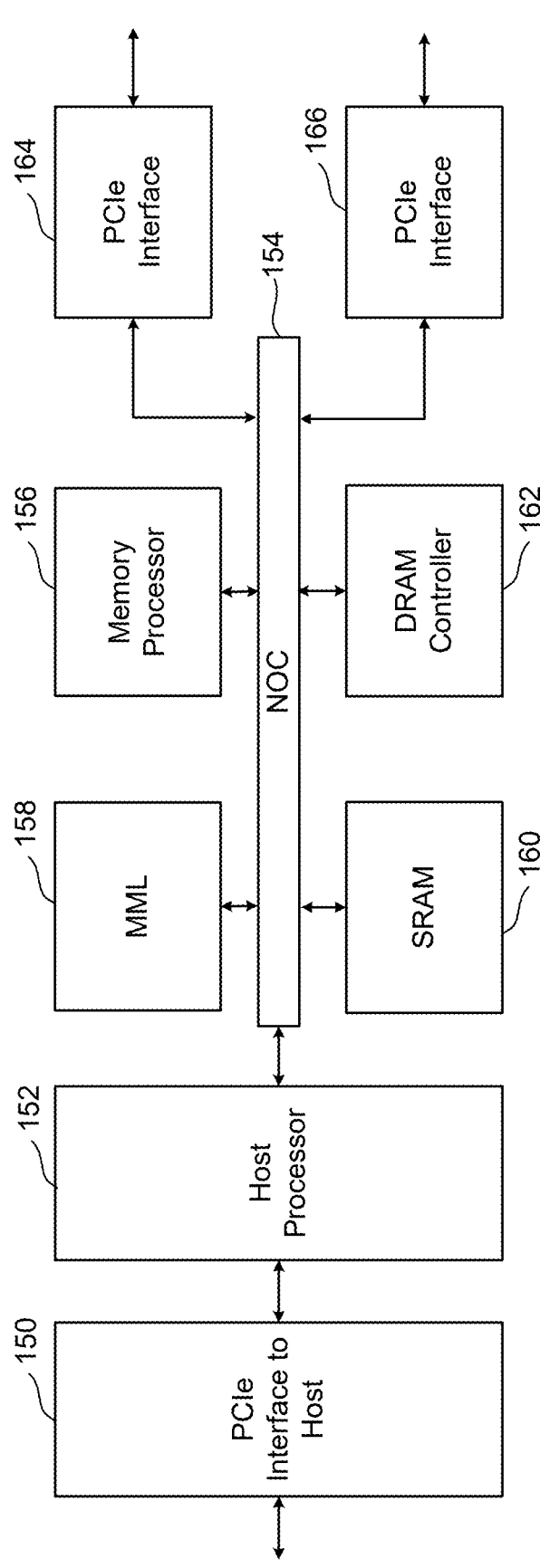
FIG. 2 is a block diagram of one embodiment of a Front End Processor Circuit. In some embodiments, the Front End Processor Circuit is part of a controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 302 of FIGS. 5A and 5B below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

Figure 3:
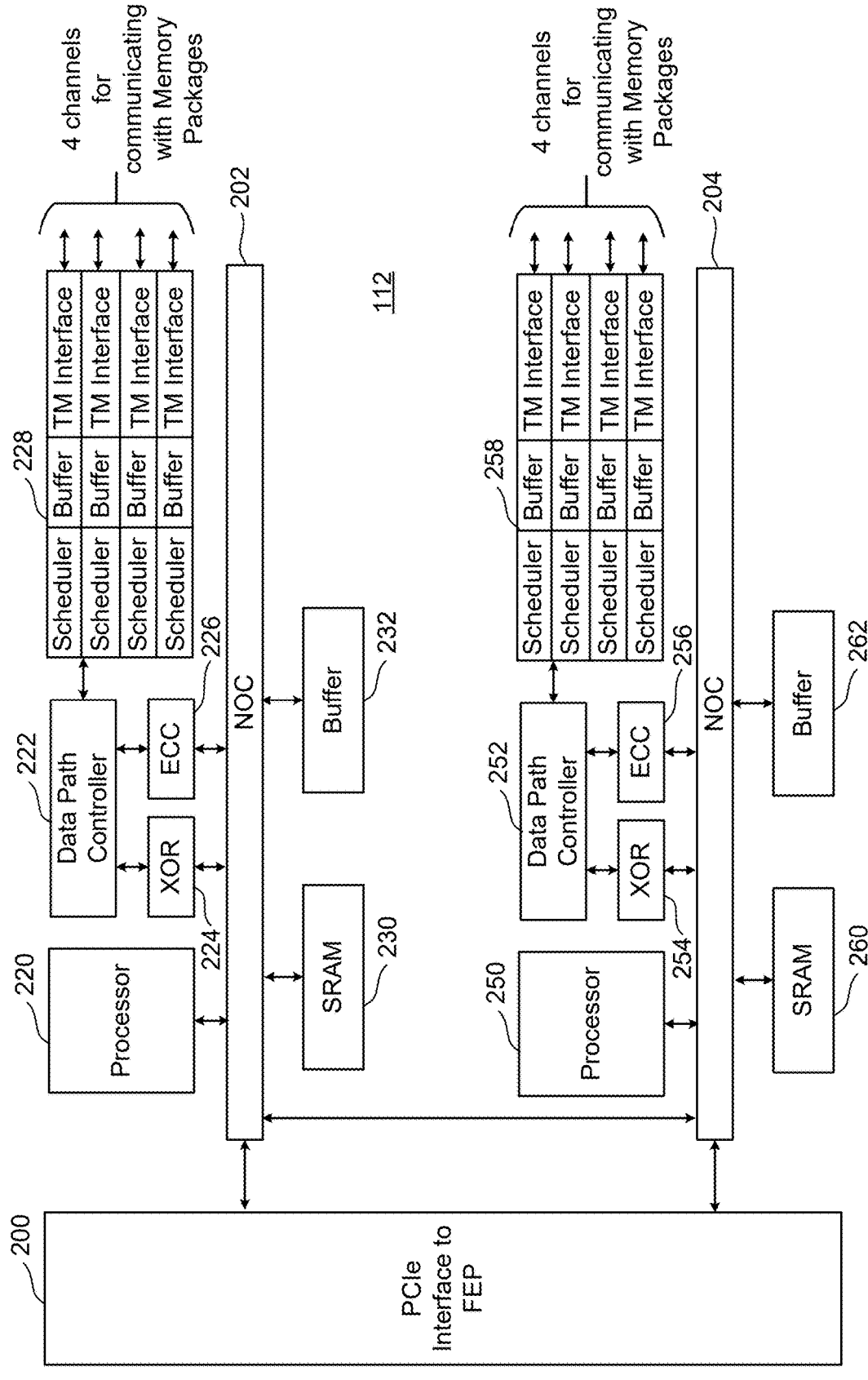
FIG. 3 is a block diagram of one embodiment of a Back End Processor Circuit.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory dic.

FIG. 5A is a block diagram that depicts one example of a memory die 300 that can implement the technology described herein. Memory die 300, which can correspond to one of the memory die 300 of FIG. 2B, includes a memory array 302 that can include any of memory cells described in the following. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only a single block is shown for array 302, a memory die can include multiple arrays that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from a host and provides output data and status to the host. In other embodiments, system control logic 360 receives data and commands from a separate controller circuit and provides output data to that controller circuit, with the controller circuit communicating with the host. In some embodiments, the system control logic 360 can include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 controls the power and voltages supplied to the rows and columns of the memory 302 during memory operations and may include charge pumps and regulator circuit for creating regulating voltages. System control logic 360 includes storage 366, which may be used to store parameters for operating the memory array 302.

Commands and data are transferred between the controller 102 and the memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the controller 102.

In some embodiments, all of the elements of memory die 300, including the system control logic 360, can be formed as part of a single die. In other embodiments, some or all of the system control logic 360 can be formed on a different die.

For purposes of this document, the phrase "one or more control circuits" can include a controller, a state machine, a micro-controller, micro-processor, and/or other control circuitry as represented by the system control logic 360, or other analogous circuits that are used to control non-volatile memory.

In one embodiment, memory structure 302 comprises a three dimensional memory array of non-volatile memory cells in which multiple memory levels are formed above a single substrate, such as a wafer. The memory structure may comprise any type of non-volatile memory that is monolithically formed in one or more physical levels of memory cells having an active area disposed above a silicon (or other type of) substrate. In one example, the non-volatile memory cells comprise vertical NAND strings with charge-trapping.

In another embodiment, memory structure 302 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe-Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5A can be grouped into two parts, the structure of memory structure 302 of the memory cells and the peripheral circuitry, including all of the other elements. An important characteristic of a memory circuit is its capacity, which can be increased by increasing the area of the memory die of memory system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the memory system 100 is the amount of area to devote to the memory structure 302 and the amount of area to devote to the peripheral circuitry.

Another area in which the memory structure 302 and peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 5A onto separately formed dies that are then bonded together. More specifically, the memory structure 302 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

FIG. 5B shows an alternative arrangement to that of FIG. 5A which may be implemented using wafer-to-wafer bonding to provide a bonded die pair. FIG. 5B depicts a functional block diagram of one embodiment of an integrated memory assembly 307. The integrated memory assembly 307 may be used in a memory package 104 in storage system 100. The integrated memory assembly 307 includes two types of semiconductor die (or more succinctly, "die"). Memory structure die 301 includes memory structure 302. Memory structure 302 may contain non-volatile memory cells. Control die 311 includes control circuitry 360, 310, 320. In some embodiments, the control die 311 is configured to connect to the memory structure 302 in the memory structure die 301. In some embodiments, the memory structure die 301 and the control die 311 are bonded together.

FIG. 5B shows an example of the peripheral circuitry, including control circuits, formed in a peripheral circuit or control die 311 coupled to memory structure 302 formed in memory structure die 301. Common components are labelled similarly to FIG. 5A. It can be seen that system control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require any additional process steps. The control die 311 could also be referred to as a CMOS die, due to the use of CMOS technology to implement some or all of control circuitry 360, 310, 320.

FIG. 5B shows column control circuitry 310 including sense amplifier(s) 330 on the control die 311 coupled to memory structure 302 on the memory structure die 301 through electrical paths 306. For example, electrical paths 306 may provide electrical connection between column decoder 312, driver circuitry 314, and block select 316 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each electrical path 308 may correspond to a word line, dummy word line, or select gate line. Additional electrical paths may also be provided between control die 311 and memory structure die 301.

For purposes of this document, the phrase "one or more control circuits" can include one or more of controller 102, system control logic 360, column control circuitry 310, row control circuitry 320, a micro-controller, a state machine, and/or other control circuitry, or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

FIG. 6A is a perspective view of a portion of one example embodiment of a monolithic three-dimensional (3D) memory array that can correspond to memory structure 302, which includes a plurality non-volatile memory cells. For example, FIG. 6A shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-300 alternating dielectric layers and conductive layers. One example embodiment includes 96 data word line layers, 8 select layers, 6 dummy word line layers and 110 dielectric layers. More or less than 108-300 layers can also be used. As will be explained below, the alternating dielectric layers and conductive layers are divided into four "fingers" by local interconnects LI. FIG. 6A shows two fingers and two local interconnects LI. Below the alternating dielectric layers and word line layers is a source line layer SL. Memory holes are formed in the stack of alternating dielectric layers and conductive layers. For example, one of the memory holes is marked as MH. Note that in FIG. 6A, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 302 is provided below with respect to FIGS. 6B-6H.

FIG. 6B is a block diagram explaining one example organization of memory structure 302, which is divided into two planes 602 and 604. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, memory cells can be grouped into blocks for other reasons, such as to organize the memory structure 302 to enable the signaling and selection circuits. In some embodiments, a block represents a group of connected memory cells as the memory cells of a block share a common set of word lines. The memory blocks can be used to store both user data received from a host 120 and also to store system data, such as operating parameters and other data that the memory die 300 or controller 102 can use for operating the memory system 100. For example, as shown in FIG. 6B block 0 620 of plane 602 is used for storing system data, such as the bad block flags BBK that are discussed in more detail below. The system data block 620 is here shown in Block 0, but can be located in other blocks and its content can be used similarly to the 366.

FIGS. 6C-6H depict an example 3D NAND structure that corresponds to the structure of FIG. 6A and can be used to implement memory structure 302 of FIGS. 5A and 5B. FIG. 6C is a block diagram depicting a top view of a portion of one block from memory structure 302. The portion of the block depicted in FIG. 6C corresponds to portion 606 in block 2 of FIG. 6B. As can be seen from FIG. 6C, the block depicted in FIG. 6C extends in the direction of arrow 632. In one embodiment, the memory array has many layers; however, FIG. 6C only shows the top layer.

FIG. 6C depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 6C depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 6C extends in the direction of arrow 632, the block includes more vertical columns than depicted in FIG. 6C FIG. 6C also depicts a set of bit lines 415, including bit lines 411, 412, 413, 414, . . . 419. FIG. 6C shows twenty four bit lines because only a portion of the block is depicted. It is contemplated that more than twenty four bit lines are connected to vertical columns of the block. Each of the circles representing vertical columns has an "x" to indicate its connection to one bit line. For example, bit line 414 is connected to vertical columns 422, 432, 442 and 452.

The block depicted in FIG. 6C includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 6C is divided into regions 420, 430, 440 and 450, which are referred to as fingers. In the layers of the block that implement memory cells, the four regions are referred to as word line fingers that are separated by the local interconnects. In one embodiment, the word line fingers on a common level of a block connect together to form a single word line. In another embodiment, the word line fingers on the same level are not connected together. In one example implementation, a bit line only connects to one vertical column in each of regions 420, 430, 440 and 450. In that implementation, each block has sixteen rows of active columns and each bit line connects to four rows in each block. In one embodiment, all of four rows connected to a common bit line are connected to the same word line (via different word line fingers on the same level that are connected together); therefore, the system uses the source side selection lines and the drain side selection lines to choose one (or another subset) of the four to be subjected to a memory operation (program, verify, read, and/or erase).

Although FIG. 6C shows each region having four rows of vertical columns, four regions and sixteen rows of vertical columns in a block, those exact numbers are an example implementation. Other embodiments may include more or less regions per block, more or less rows of vertical columns per region and more or less rows of vertical columns per block.

FIG. 6C also shows the vertical columns being staggered. In other embodiments, different patterns of staggering can be used. In some embodiments, the vertical columns are not staggered.

FIG. 6D depicts a portion of one embodiment of a three dimensional memory structure 302 showing a cross-sectional view. This cross sectional view cuts through vertical columns 432 and 434 and region 430 (see FIG. 6C). The structure of FIG. 6D includes four drain side select layers SGD0, SGD1, SGD2 and SGD3; four source side select layers SGS0, SGS1, SGS2 and SGS3; six dummy word line layers DD0, DD1, DS0, DS1, WLDL, WLDU; and ninety six data word line layers WLL0-WLL95 for connecting to data memory cells. Other embodiments can implement more or less than four drain side select layers, more or less than four source side select layers, more or less than six dummy word line layers, and more or less than ninety six word lines. Vertical columns 432 and 434 are depicted protruding through the drain side select layers, source side select layers, dummy word line layers and word line layers. In one embodiment, each vertical column comprises a vertical NAND string. For example, vertical column 432 comprises NAND string 484. Below the vertical columns and the layers listed below is a substrate, an insulating film 454 on the substrate, and source line SL. The NAND string of vertical column 432 has a source end at a bottom of the stack and a drain end at a top of the stack. As in agreement with FIG. 6C, FIG. 6D show vertical column 432 connected to Bit Line 414 via connector 491. Local interconnects 404 and 406 are also depicted.

For case of reference, drain side select layers SGD0, SGD1, SGD2 and SGD3; source side select layers SGS0, SGS1, SGS2 and SGS3; dummy word line layers DD0, DD1, DS0, DS1, WLDL and WLDU; and word line layers WLL0-WLL95 collectively are referred to as the conductive layers. In one embodiment, the conductive layers are made from a combination of TiN and Tungsten. In other embodiments, other materials can be used to form the conductive layers, such as doped polysilicon, metal such as Tungsten, or metal silicide. In some embodiments, different conductive layers can be formed from different materials. Between conductive layers are dielectric layers DL0-DL111. For example, dielectric layers DL104 is above word line layer WLL94 and below word line layer WLL95. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WLL0-WLL95 connect to memory cells (also called data memory cells). Dummy word line layers DD0, DD1, DS0, DS1, WLDL and WLDU connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. A dummy word line is connected to dummy memory cells. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

FIG. 6D also shows a joint area. In one embodiment it is expensive and/or challenging to etch ninety six word line layers intermixed with dielectric layers. To case this burden, one embodiment includes laying down a first stack of forty eight word line layers alternating with dielectric layers, laying down the joint area, and laying down a second stack of forty eight word line layers alternating with dielectric layers. The joint area is positioned between the first stack and the second stack. The joint area is used to connect to the first stack to the second stack. In FIG. 6D, the first stack is labeled as the "Lower Set of Word Lines" and the second stack is labeled as the "Upper Set of Word Lines." In one embodiment, the joint area is made from the same materials as the word line layers. In one example set of implementations, the plurality of word lines (control lines) comprises a first stack of alternating word line layers and dielectric layers, a second stack of alternating word line layers and dielectric layers, and a joint area between the first stack and the second stack, as depicted in FIG. 6D.

FIG. 6E depicts a logical representation of the conductive layers (SGDL0, SGDL1, SGDL2, SGDL3, SGSL0, SGSL1, SGSL2, SGSL3, DDL0, DDL1, DSL0, DSL1, and WLLL0-WLLL95) for the block that is partially depicted in FIG. 6D. As mentioned above with respect to FIG. 4B, in one embodiment local interconnects 402, 404, 406, 408 and 410 break up the conductive layers into four regions/fingers (or sub-blocks). For example, word line layer WLL94 is divided into regions 460, 462, 464 and 466. For word line layers (WLL0-WLL127), the regions are referred to as word line fingers; for example, word line layer WLL126 is divided into word line fingers 460, 462, 464 and 466. For example, region 460 is one word line finger on one word line layer. In one embodiment, the four word line fingers on a same level are connected together. In another embodiment, each word line finger operates as a separate word line.

Drain side select gate layer SGDL0 (the top layer) is also divided into regions 420, 430, 440 and 450, also known as fingers or select line fingers. In one embodiment, the four select line fingers on a same level are connected together. In another embodiment, each select line finger operates as a separate word line.

FIG. 6F depicts a cross sectional view of region 429 of FIG. 6D that includes a portion of vertical column 432 (a memory hole). In one embodiment, the vertical columns are round; however, in other embodiments other shapes can be used. In one embodiment, vertical column 432 includes an inner core layer 470 that is made of a dielectric, such as $SiO_2$. Other dielectric materials can also be used. Surrounding inner core 470 is polysilicon channel 471. Materials other than polysilicon can also be used. Note that it is the channel 471 that connects to the bit line and the source line. Surrounding channel 471 is a tunneling dielectric 472. In one embodiment, tunneling dielectric 472 has an ONO structure. Surrounding tunneling dielectric 472 is charge trapping layer 473, such as (for example) Silicon Nitride. Other memory materials and structures can also be used. The technology described herein is not limited to any particular material or structure.

FIG. 6F depicts dielectric layers DLL105, DLL104, DLL103, DLL102 and DLL101, as well as word line layers WLL95, WLL94, WLL93, WLL92, and WLL91. Each of the word line layers includes a word line region 476 surrounded by an aluminum oxide layer 477, which is surrounded by a blocking oxide ($SiO_2$) layer 478. The physical interaction of the word line layers with the vertical column forms the memory cells. Thus, a memory cell, in one embodiment, comprises channel 471, tunneling dielectric 472, charge trapping layer 473, blocking oxide layer 478, aluminum oxide layer 477 and word line region 476. For example, word line layer WLL95 and a portion of vertical column 432 comprise a memory cell MC1. Word line layer WLL94 and a portion of vertical column 432 comprise a memory cell MC2. Word line layer WLL93 and a portion of vertical column 432 comprise a memory cell MC3. Word line layer WLL92 and a portion of vertical column 432 comprise a memory cell MC4. Word line layer WLL91 and a portion of vertical column 432 comprise a memory cell MC5. In other architectures, a memory cell may have a different structure; however, the memory cell would still be the storage unit.

When a memory cell is programmed, electrons are stored in a portion of the charge trapping layer 473 which is associated with the memory cell. These electrons are drawn into the charge trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

FIG. 6G is a schematic diagram of a portion of the memory depicted in in FIGS. 6A-6F. FIG. 6G shows physical word lines WL0-WL95 running across the entire block, corresponding to the word line layers WLL0-WLL95. The structure of FIG. 6G corresponds to portion 606 in Block 2 of FIGS. 6B-6F, including bit lines 411, 412, 413, 414, . . . 419. Within the block, each bit line is connected to four NAND strings. Drain side selection lines SGD0, SGD1, SGD2 and SGD3 are used to determine which of the four NAND strings connect to the associated bit line(s). Source side selection lines SGS0, SGS1, SGS2 and SGS3 are used to determine which of the four NAND strings connect to the common source line. The block can also be thought of as divided into four sub-blocks SB0, SB1, SB2 and SB3. Sub-block SB0 corresponds to those vertical NAND strings controlled by SGD0 and SGS0, sub-block SB1 corresponds to those vertical NAND strings controlled by SGD1 and SGS1, sub-block SB2 corresponds to those vertical NAND strings controlled by SGD2 and SGS2, and sub-block SB3 corresponds to those vertical NAND strings controlled by SGD3 and SGS3.

The memory structure of FIGS. 6A-6F is a complex structure having many processing steps involved in its formation. A number of different defects can occur in the fabrication process. One example is an "open memory hole", in which (referring to FIG. 6A) a memory hole MH is not well connected to the corresponding bit line BL by way of connector 491 (FIG. 6D). In other cases, select gates or memory cells may not be properly formed, so that a NAND string cannot be selected or de-selected, or a memory cell does not program or read properly. Other defects can include word lines or select lines that are broken or have a short or leak to an adjoining select line or word line due to processing variations in the thicknesses of the many layers.

Due to such defects, a block of the memory many be unusable or, even if usable, have reduced performance, reduced capacity, or reduced endurance. To determine the presence of defects, subsequent to manufacture and prior to being sent out to customers, the memory device can be subjected to a "die sort" in which it undergoes a series of tests of the memory structure and peripheral circuitry. Such tests are performed on a new or "fresh" memory die prior to its being assembled into a memory package with other memory die or a controller and put into customer use. The testing is typically done using one or more external devices or equipment connected to the die, although in some embodiments some or all of the testing can be performed by the die itself using a built-in self-test (BIST) process. If a memory die has too many defective blocks, or defects of a particular serious type, the die is discarded. When the defects of a die are limited to a number of specific memory blocks, and the number of such defective blocks is not too great, the defective blocks can be marked on the die and the die still used, but with the marked blocks either not used or used on a restricted basis.

For NAND products, as the devices go through program/ erase cycles, the performance of blocks will gradually degrade, and large numbers grown bad blocks (GBB) are present when it approaches the end-of-life. This causes the decrement of the good block budget and eventually there are not enough to good blocks achieve the required storage capacity. To address this, the following presents techniques that can trigger an accurate bad block segmentation and release mode to meet the storage capacity improve the performance of products at the end of the life cycle and extend the service life. Additionally, during electrical failure analysis, returned material analysis, or for test purposes, there may be a need to accurately partial release the factory bad blocks (FBB) from a Fuse ROM block where this data is stored, but previously the common method is to release the whole FBB. The following approach is flexible and uses an intelligent approach to achieve this requirement without need of any test data logs that would be depended on for partial release in the traditional method.

FIG. 7 illustrates an embodiment of a bad block structure. In the embodiments presented in the following, a bad block flag of a factory failed block is stored in a Fuse ROM block of the NAND memory system using a bad block structure that can accurately segment and release FBB by adding the failure category for all FBB. The new bad block structure contains one bit for block flag and several bits for failure category, such as for type or degree of failure. As illustrated in the embodiment of the table of FIG. 7, Bit [0] is the block flag of block0, where a value of 1 represents the initial value or good block and a value of 0 represents the bad block. Bits [1], [2], and [3] are the failure category of block0, where a value of 111 represents the initial value or good block, and other values can represent different failure category which are defined by the requirements, such as failed test stages or failed bit ignore criteria. Similarly, bit [4] is the block flag of block 1, and bits [5], [6], and [7] are the failure category of this block1. Therefore, byte 0 stores the bad block information of two blocks, byte 1 is formed by the complement of byte 0 for error detection and correction purpose. Two bytes are used to store two bad block information in the Fuse ROM block. Notice that the bit count for failure categories can be adjusted based on requirements, in which case one byte may contain bad block information for one or more blocks.

FIG. 8 illustrates an embodiment for a bad block structure in a Fuse ROM block. Each block on the die has a corresponding bad block storage address in a Fuse ROM block on the die. For example, if a die contains 2000 data blocks, it can have one user ROM block and one Fuse ROM block. According to the structure defined in FIG. 7, the bad blocks address in Fuse ROM block is described as FIG. 8, bytes 0x000h to 0x07D1 can store all of the blocks' information with one bad block flag and 3 bits for failure category. For stability purposes, all information is stored in Fuse ROM block in a binary mode, and multiple copies can be retained. The important information of a NAND device, including bad block, bad column, parameter, block redundancy, and other system data is stored in Fuse ROM block, as shown in FIG. 9.

FIG. 9 illustrates an embodiment for the information structure in Fuse ROM block, where other embodiments can use other orders for the different sets of information. A first portion can be the bad block information for the die, where this can have the structure as presented FIG. 8. The next portion of the Fuse ROM block can be used for bad column information, which can list bad columns of the die. Additional NAND and system parameter values for operating the die, such as determined as trim values at test time, can follow. Another field is block redundancy (BLKRD), in some embodiments, remapping information to a redundant block to use in place of the defective block, and there is also column redundancy (CRD), presence of extra column allows NAND to have defective columns. In addition to the data content, the Fuse ROM block can include corresponding ECC data and perhaps other data.

These embodiment for a bad block structure can be applied across may applications. One example of these applications is to improve the performance of products at the end of the life cycle and extend the service life by triggering accurate bad block segmentation and release mode.

System products will have a specific error correction capability, as discussed above with respect to FIG. 3. Based on this requirement, the NAND devices as provided to the customer need to implement corresponding bit ignore (BI) criteria of how many bad bits can be tolerated in their test flow to meet the system ECC specification. For example, if a system product requires that the BI count is not greater than 120 fail bits per segment, then several BI criteria are implemented in factory testing, such as 110 bits/segment, 100 bits/segment, 80 bits/segment, etc. In order to provide a good margin for product reliability, the final products shipped to the customer will be better than the system ECC specification, which may be 80 bits/segment. In these products, any blocks that read fail bits higher than 80 bits/ segment is already marked as FBB. With the new bad block structure, the failure category of FBB can be classified by BI criteria, as illustrated in FIG. 10.

FIG. 10 is an embodiment for incorporating failure category, such as by bit ignore values for error correction code, in field applications. As illustrated in the example of FIG. 10, a failure category of binary 111 indicates the initial value when block is not tested or a good block; 110 indicates the FBB failed the BI criteria of 110 bits/segment, with its failed bit count is more than 110 bits/segment; 101 indicates the FBB failed the BI criteria of 100 bits/segment, having a failed bit count between 100 to 110; similarly, 100 indicates the FBB failed the BI criteria of 80 bits/segment, with its failed bit count is between 80 to 100; and so on. In this way, there can be set multiple BI criteria. Combined with the block flag, 1111 means initial value or good block, and all FBB are separately marked as 1100, 1010, 1000, and so on. All these bad block information is stored in Fuse ROM block.

The performance of blocks in a NAND device will gradually degrade with continued user cycling in the field, leading to massive grown bad blocks when it approaches to the end-of-life. This leads to the decrement of a good block budget and eventually there will not be enough blocks to achieve the required storage capacity. With the classified FBB shown of FIG. 10, the system can trigger accurate bad block segmentation and release mode to meet the storage capacity.

FIG. 11 is a flowchart of an embodiment for storage capacity recovery with the described bad block structure. Starting with a fresh die at 1101, the bad block (BB) map 1102 in controller only contains the list of factory bad blocks (FBBs), but with user cycling at step 1103, grown bad blocks (GBB) appears and are also recorded in the BB map 1104. Based on device characterization, user requirements, and other factors can be used to set a pre-defined threshold for a bad block count threshold and a pre-defined value for a cycling number. The bad block count is compared against the threshold at step 1105 and, if it has not exceeded the threshold, user cycling continues at step 1107 that then loops back to step 1105. Once the bad block count is greater than pre-defined threshold at step 1105, the flow goes to step 1111 where the cycling number is checked again the pre-defined value for a cycling number and, if not, the flow can proceed to step 1117 for further user cycling. Once the cycling number is greater than pre-defined value at step 1111, the specific FBB will be accurately segmented and released at step 1113 as good block: e.g., FBB which is marked as 1000 will be reset as 1111, that means a FBB with the failed bits count between 80~100 bits/segment will be released as good block. The bad block map is updated at step 1115 with the updated FBB list and no change for GBB list. By this method, the good block count increases and helps to meet the storage capacity, where the user can continue to cycle the device at step 1117, improving the performance of products at the end of the life cycle and extending the service life. The flow then ends at 1121.

FIG. 12 is a block diagram of an embodiment for implementing 1113 and 1115, providing more detailed logic on the operation to segment and release the accurate FBB and update the BB map. Before user cycling, the FBB information in Fuse ROM block 1201, such as shown loaded into ROM of state machine 362, can be read out of NAND 1207 through Register 1205 and saved to the FBB list 1219 in BB map 1223 (corresponding to those of 1102 and 1104) at controller 1211, and then GBB list 1217 in BB map 1223 is used to record the grown bad blocks during user cycling. After triggering the accurate segmentation and release mode, the Processor 1213 of tester 1209 will get the FBB list 1219 from BB map 1223 and accurately segment the specified bad blocks by the bad block information, such as the value 1000, and then reset it to the good block value of 1111, leaving the rest of the bad block information unchanged. After that, there is a transfer the updated FBB information from Processor 1213 into Temp BB map 1221, and finally update in Fuse ROM block with the updated FBB information through Register 1205. After these steps, the system can update the BB map 1223 by reading out updated FBB information from Fuse ROM block 1201 to FBB list 1219, and the original FBB of with a value of 1000 is released to good block. As shown in FIG. 11, after updating the BB chart at step 1115, the user can operate these blocks normally.

The presented embodiments for a bad block structure are also helpful for factory testing prior to shipping the devices to users. One of the applications is to classify FBB by factory test stages, as there are many test stages in a NAND fabrication facility, such as die sort, wafer burn in, known good die tests, short time high temperature tests, and so on. Previously, there was no easy method to get the failed test stage of each FBB without checking out the data log of all test stages, and, for some older samples from returned material analysis cases, it is more difficult to find the test data logs. To solve this problem, the presented embodiments for bad block structures can define the failure category by test stages.

FIG. 13 is an example for Failure Category in a factory testing application (e.g., by test stages). As shown in the example embodiment of table of FIG. 13, failure category of binary value 111 indicates initial value or good block, 110 indicates the FBB failed in die sort 1, and 101 indicates the FBB failed in die sort 2, and so on. In this way, combined with the block flag, 1111 means an initial value or good block, and all FBB are separately marked as 1100, 1010, 1000, 0110, 0100, and so on. All this bad block information can stored in Fuse ROM block, so that by way of this bad block information restored in Fuse ROM block, factory can know the test stage that each FBB was failed.

FIG. 14 is a flowchart of an embodiment to mark the factory bad blocks by different failure categories in factory test stages. After starting the factor test at 1401, first step 1403 is initializing all the block flags and failure categories to 1 in the Fuse ROM block, meaning that all bad block information is set to 1111. Step 1405 follows to do die sort 1 test, with the FBB failed in this step marked in Fuse ROM block with 1100 at step 1407. The next step 1409 is for die sort 2 tests for those blocks that pass die sort 1 at step 1405, and the FBB of this step 1409 is marked as 1010 at step 1411. Similarly, wafer burn in at step 1413, known good die tests, short time high temperature tests, and other tests follow. After all factory test stages completed, all FBBs are stored in Fuse ROM block with separate information of 1100 at step 1407, and 1010, 1000, etc., at step 1417, until factory testing ends at step 1419.

FIG. 15 is a flowchart of an embodiment for apply trigger accurate BB segmentation and release mode in factory test. For example, Wafer burn in is at step 1501 (that correspond to step 1413 in FIG. 14), with good blocks going to know good dies at 1503 and bad blocks written into the Fuse ROM block with flag=0, category=100 at step 1505 (that can correspond to step 1415 o FIG. 14). If needs to accurately release the FBB of wafer burn in 1507, due to blocks are incorrectly marked in step 1505 as FBB by program problems, hardware issue or other issues. Then trigger accurate BB segmentation and release mode, firstly read FBB information from Fuse ROM block to FBB list in BB map 1509, secondly reset wafer burn in FBB information value 1000 to 1111 by processor 1511, finally update Fuse ROM block with the updated FBB information 1513. By these steps, FBB for wafer burn in is released to good block. If need retest this stage, then go to step 1501. In a traditional approach, this would be done manually to process the data logs of this test stage, and to find out its FBB, then read all bad blocks information from Fuse ROM and manually modify this data to reset corresponding FBBs as good blocks, finally reprogram Fuse ROM block by the modified data. The manual work takes a lot of time and cannot be done without test data logs. For electrical failure analysis, return material analysis, this bad block information structure can also good for accurate FBB segmentation and release without data log.

Consequently, the embodiments present above can, in field application, the accurate bad block segmentation and release mode can help to recover storage capacity that can improve the performance of products at the end of the life cycle and extend the service life. In factory applications, this flexible and smart to accurately release the partial factory bad blocks for electrical fault analysis, returned material analysis, or test purposes, without any test data logs which we must depend on for partial release in the traditional method.

One embodiment includes a non-volatile memory device comprising a control circuit configured to connect to a plurality of blocks of non-volatile memory cells. The control circuit configured to: maintain, for each block, corresponding bad block information, including a first bit indicating whether the block is good or bad and a plurality of additional bits indicating, for indicated bad blocks, one of a plurality of failure categories; update the first bit to indicate that the corresponding block is bad in response to determining the corresponding block to be bad during user operation of the memory device; determine whether a number of blocks having a first bit indicating that the corresponding block is bad exceeds a threshold value; in response to the number of blocks to determining that the number of blocks having a first bit indicating that the corresponding block is bad exceeds a threshold value, reset the bad block information for blocks whose corresponding bad block information has a first bit indicating that the block is bad and a first failure category to have a first bit indicating that the corresponding block is good; and continue user operation of the memory device using the reset bad block information.

Still another embodiment includes a method, comprising: receiving a non-volatile memory die comprising a plurality of blocks of non-volatile memory cells; for each block, performing a sequence of a plurality of tests; for each of the plurality of tests for each block, determining whether the block passed the test; and storing in a first of the blocks bad block information for each the plurality of blocks, the bad block information for each block including a first bit indicating whether the block failed any of the plurality of tests and a plurality of additionally bits indicating, for blocks that failed any of the tests, which tests the block failed.

One embodiment includes a method, comprising: receiving a memory device having a plurality of blocks of non-volatile memory cells, the memory device having for each block corresponding bad block information as determined in a test process, the bad block information including a first bit indicating whether the block is good or bad and a plurality of additional bits indicating, for indicated bad blocks, indicating one of a plurality of failure categories; updating the first bit to indicate that the corresponding block is bad in response to determining the corresponding block to be bad during user operation of the memory device; determining whether a number of blocks having a first bit indicating that the corresponding block is bad exceeds a threshold value; in response to the number of blocks to determining that the number of blocks having a first bit indicating that the corresponding block is bad exceeds a threshold value, resetting the bad block information for blocks whose corresponding bad block information has a first bit indicating that the block is bad and a first failure category to have a first bit indicating that the corresponding block is good; and continuing user operation of the memory device using the reset bad block information.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
a control circuit configured to connect to a plurality of blocks of non-volatile memory cells, the control circuit configured to:
maintain, for each block, corresponding bad block information, including a first bit indicating whether the block is good or bad and a plurality of additional bits indicating, for indicated bad blocks, one of a plurality of failure categories comprising different degrees of failure for a category of failure, including different numbers of bits that can be ignored during error correction of data read from the corresponding block;
update the first bit to indicate that the corresponding block is bad in response to determining the corresponding block to be bad during user operation of the memory device;
determine whether a number of blocks having a first bit indicating that the corresponding block is bad exceeds a threshold value;
in response to the number of blocks to determining that the number of blocks having a first bit indicating that the corresponding block is bad exceeds a threshold value, reset the bad block information for blocks whose corresponding bad block information has a first bit indicating that the block is bad and a first failure category to have a first bit indicating that the corresponding block is good, including resetting the failure category to allow for a larger number of bits to be ignored; and
continue user operation of the memory device using the reset bad block information.

2. The non-volatile memory device of claim 1, wherein at least a portion of the control circuit is formed on a control die, the non-volatile memory device further comprising:
a memory die including the plurality of blocks of non-volatile memory cells, the memory die separate from and bonded to the control die.

3. The non-volatile memory device of claim 1, wherein the control circuit if further configured to:
in response to the number of blocks to determining that the number of blocks having a first bit indicating that the corresponding block exceeds a threshold value, reset the failure category of the bad block information for blocks whose corresponding bad block information has the first bit indicating that the block is bad and of the first failure category.

4. The non-volatile memory device of claim 1, wherein the control circuit if further configured to:
in response to the number of blocks to determining that the number of blocks having a first bit indicating that the corresponding block exceeds a threshold value, determine whether the block has undergone a number of program-erase cycles larger that a pre-defined value, wherein resetting the bad block information is further in response the block's number of program erase cycles being larger than the pre-defined value.

5. The non-volatile memory device of claim 1, wherein the bad block information includes bad block information determined during device testing prior to user operation of the memory device.

6. The non-volatile memory device of claim 1, wherein the failure categories include different categories of failure.

7. The non-volatile memory device of claim 1, wherein, during continued operation of the memory device using the reset bad block information, the control circuit is further configured to:
update the first bit of the reset bad block information to indicate that the corresponding block is bad in response to determining the corresponding block to be bad during user operation of the memory device;
determine whether the number of blocks having a first bit of the reset bad block information indicating that the corresponding block is bad exceeds a threshold value; and
in response to the number of blocks to determining that the number of blocks having a first bit of the reset bad block information indicating that the corresponding block is bad exceeds a threshold value, further reset the bad block information for blocks whose corresponding reset bad block information has a first bit indicating that the block is bad and a first failure category to have a first bit indicating that the corresponding block is good.

8. The non-volatile memory device of claim 1, wherein to maintain the bad block information, the control circuit is further configured to store a copy of the bad block information in one of the blocks of non-volatile memory cells.

9. The non-volatile memory device of claim 1, further comprising:

a memory array including the blocks of non-volatile memory cells, wherein the memory array has a three-dimensional NAND structure and the blocks are erase blocks.

10. The method, comprising:

receiving a non-volatile memory die comprising a plurality of blocks of non-volatile memory cells;

for each block, performing a sequence of a plurality of tests;

for each of the plurality of tests for each block, determining whether the block passed the test;

storing in a first of the blocks bad block information for each the plurality of blocks, the bad block information for each block including a first bit indicating whether the block failed any of the plurality of tests and a plurality of additionally bits indicating, for blocks that failed any of the tests, which tests the block failed; and subsequent to storing in a first block the bad block information for each the plurality of blocks, providing the non-volatile memory die to a user; and during user operation of the non-volatile memory die:

updating the first bit to indicate that the corresponding block is bad in response to determining the corresponding block to be bad during user operation;

determining whether the number of blocks having a first bit indicating that the corresponding block is bad exceeds a threshold value; and in response to the number of blocks to determining that the number of blocks having a first bit indicating that the corresponding block is bad exceeds a threshold value, resetting the bad block information for blocks whose corresponding bad block information has a first bit indicating that the block is bad and a first failure category to have a first bit indicating that the corresponding block is good.

11. The method of claim 10, further comprising:

for each block, subsequent to determining for each of the plurality of tests whether the block passed the test, in response to the block having failed a specified one of the tests, resetting the blocks bad block information to indicate that the block passed the specified test.

12. The method of claim 10, wherein receiving the non-volatile memory die includes fabricating the non-volatile memory die.

13. The method of claim 10, wherein one or more of the tests are a die sort process.

14. A method, comprising:

receiving a memory device having a plurality of blocks of non-volatile memory cells, the memory device having for each block corresponding bad block information as determined in a test process, the bad block information including a first bit indicating whether the block is good or bad and a plurality of additional bits indicating, for indicated bad blocks, indicating one of a plurality of failure categories;

updating the first bit to indicate that the corresponding block is bad in response to determining the corresponding block to be bad during user operation of the memory device;

determining whether a number of blocks having a first bit indicating that the corresponding block is bad exceeds a threshold value;

in response to the number of blocks to determining that the number of blocks having a first bit indicating that the corresponding block is bad exceeds a threshold value, resetting the bad block information for blocks whose corresponding bad block information has a first bit indicating that the block is bad and a first failure category to have a first bit indicating that the corresponding block is good; and continuing user operation of the memory device using the reset bad block information includes:

updating the first bit of the reset bad block information to indicate that the corresponding block is bad in response to determining the corresponding block to be bad during user operation of the memory device;

determining whether a number of blocks having a first bit of the reset bad block information indicating that the corresponding block is bad exceeds a threshold value; and in response to the number of blocks to determining that the number of blocks having a first bit of the reset bad block information indicating that the corresponding block is bad exceeds a threshold value, further resetting the bad block information for blocks whose corresponding reset bad block information has a first bit indicating that the block is bad and a first failure category to have a first bit indicating that the corresponding block is good.

15. The method of claim 14, further comprising:

in response to the number of blocks to determining that the number of blocks having a first bit indicating that the corresponding block exceeds a threshold value, resetting failure category of the bad block information for blocks whose corresponding bad block information has the first bit indicating that the block is bad and of the first failure category.

16. The method of claim 14, wherein continuing user operation of the memory device using the reset bad block information includes further comprises:

in response to the number of blocks to determining that the number of blocks having a first bit indicating that the corresponding block exceeds a threshold value, determining whether the block has undergone a number of program-erase cycles larger that a pre-defined value, wherein resetting the bad block information is further in response the block's number of program erase cycles being larger than the pre-defined value.

17. The method of claim 14, wherein the bad block information includes bad block information determined during device testing prior to user operation of the memory device.

18. The method of claim 14, wherein the failure categories include different categories of failure.

19. The method of claim 14, further comprising:

storing a copy of the bad block information in one of the blocks of non-volatile memory cells.

20. The method of claim 14, wherein the failure categories include different degrees of failure for a category of failure.

* * * * *